(12) United States Patent
Yamazaki et al.

(10) Patent No.: US 8,317,330 B2
(45) Date of Patent: Nov. 27, 2012

(54) IMAGE DISPLAY APPARATUS

(75) Inventors: Shoichi Yamazaki, Yokohama (JP);
Kazutaka Inoguchi, Kawasaki (JP);
Kenichi Saito, Yokohama (JP); Motomi Tsuyuki, Kawasaki (JP); Masakazu Tohara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 610 days.

(21) Appl. No.: 12/609,878

(22) Filed: Oct. 30, 2009

(65) Prior Publication Data

US 2010/0109977 A1 May 6, 2010

(30) Foreign Application Priority Data

Oct. 31, 2008 (JP) ................. 2008-281775

(51) Int. Cl.
*G03B 21/26* (2006.01)
*G03B 21/28* (2006.01)
*G02B 27/10* (2006.01)
*G02B 27/14* (2006.01)
*G02B 27/12* (2006.01)

(52) U.S. Cl. ............... 353/30; 353/81; 353/94; 353/33; 359/625; 359/638; 359/640

(58) Field of Classification Search .............. 353/30, 353/81, 94, 33; 359/625, 638, 640
See application file for complete search history.

(56) References Cited

U.S. PATENT DOCUMENTS

| 5,751,494 A | 5/1998 | Takahashi |
| 6,008,778 A | 12/1999 | Takahashi et al. |
| 6,130,784 A | 10/2000 | Takahashi |
| 2009/0115842 A1* | 5/2009 | Saito et al. ................ 348/53 |

FOREIGN PATENT DOCUMENTS

| JP | 08-152579 A | 6/1996 |
| JP | 9-166759 A | 6/1997 |
| JP | 11-326820 A | 11/1999 |

* cited by examiner

*Primary Examiner* — Georgia Y Epps
*Assistant Examiner* — Magda Cruz
(74) *Attorney, Agent, or Firm* — Rossin, Kimms & McDowell LLP

(57) ABSTRACT

The image display apparatus forms first and second images in mutually different viewing angle areas to display a combined (joined) image. The apparatus includes first and second image-forming elements respectively forming first and second original images, a first optical system reflecting a first light flux from the first image-forming element at least twice to introduce the first light flux to an exit pupil, and a second optical system reflecting a second light flux from the second image-forming element at least twice to introduce the second light flux to the first optical system. The first optical system introduces the first light flux and the second light flux from the second optical system to the exit pupil such that the first and second images respectively corresponding to the first and second original images are formed in the mutually different viewing angle areas in a first cross section.

8 Claims, 5 Drawing Sheets

IMAGE DISPLAY APPARATUS

BACKGROUND OF THE INVENTION

The present invention relates to an image display apparatus such as a head mounted display (HMD), and especially to an image display apparatus which forms images in mutually different viewing angle areas in order to display a combined image of the images joined to each other.

Observation optical systems used in HMD are desired to be compact and lightweight. The observation optical systems are also desired to be capable of displaying an image with a wide viewing angle to increase realism in the displayed image.

Among observation optical systems for the HMD, a so-called ocular optical system type observation optical system is comparatively easy to be miniaturized and provided with a wide viewing angle. However, such an ocular optical system type observation optical system requires, for providing a wide viewing angle with one image-forming element, a large-size image-forming element having a large image-forming area where an original image is formed.

In contrast thereto, a so-called tiling technology is proposed which enables displaying of an image with a wide viewing angle by using plural small-size image-forming elements having a small image-forming area. The tiling technology joins plural enlarged images to each other which are formed by light fluxes from plural original images formed on the plural image-forming elements to enable the displaying of one enlarged combined image. Such observation optical systems (HMD) for displaying an image with a wide viewing angle by the tiling technology are disclosed in Japanese Patent Laid-Open No. 09-166759 and Japanese Patent Laid-Open No. 11-326820.

Japanese Patent Laid-Open No. 09-166759 discloses an observation optical system in which two optical units are provided for one eye, each optical unit including an image-forming element and a three-surface prism having an entrance surface, an internal total reflection/exit surface and a reflection surface, and the two optical units are disposed at upper and lower positions so as not to be overlapped with each other in a right and left direction. In this observation optical system, two enlarged images are formed by the two optical units at right and left positions, and thereby one enlarged combined image with a horizontally wide viewing angle is displayed. When a cross section where a light flux (optical path) is folded by at least twice reflections by an optical element such as the three-surface prism is defined as a local meridional cross section, the "right and left (horizontal) direction" in Japanese Patent Laid-Open No. 09-166759 corresponds to a direction along a local sagittal cross section orthogonal to the local meridional cross section.

Japanese Patent Laid-Open No. 09-166759 also discloses an example in which the two optical units disposed at the upper and lower positions are relatively moved so as to be overlapped with each other in a visual axis direction of an observer. A region where the two optical units are overlapped with each other allows observation of an outside optical image (so-called optical see-through observation). In this example, enlarged images formed by the two optical units are overlapped with each other at a central region in the right and left direction to form one enlarged combined image.

Japanese Patent Laid-Open No. 11-326820 discloses an observation optical system including two division optical systems which form two enlarged images, the two division optical systems using one prism having a symmetric shape in a local meridional cross section. In this observation optical system, a light flux from an original image formed on one image-forming element enters the prism through an entrance surface thereof, is totally reflected by an internal total reflection/exit surface thereof, is then reflected by a concave mirror surface, and finally exits from the prism through the internal total reflection/exit surface to proceed to an exit pupil. A light flux from an original image formed on the other image-forming element proceeds to the same exit pupil in a same manner as that of the light flux from the one image-forming element. The two concave mirror surfaces that cause the light fluxes from the two image-forming elements to proceed to the same exit pupil are closely adjacent (joined) to each other.

However, the latter observation optical system disclosed in Japanese Patent Laid-Open No. 09-166759 does not contribute to miniaturization of the observation optical system (in other words, of the HMD) in a direction of the local meridional cross section (vertical direction) in which the observation optical system is decentered, because its viewing angle is not divided in the direction of the local meridional cross section while the viewing angle is divided in a direction of the local sagittal cross section (horizontal direction) to obtain a wide viewing angle. Each of the observation optical systems disclosed in Japanese Patent Laid-Open No. 09-166759 aims to enable the see-through observation through the overlapped region of the two optical units. Therefore, in the local meridional cross section, the viewing angles of the two optical units are the same, and parts thereof are overlapped with each other. Therefore, image division cannot be performed in the local meridional cross section, which is not effective for reducing the thickness or vertical size of the observation optical system.

Moreover, the former observation optical system disclosed in Japanese Patent Laid-Open No. 09-166759 and the observation optical system disclosed in Japanese Patent Laid-Open No. 11-326820 form a joined portion of the two images formed by the light fluxes from the two original images (corresponding to a joined portion of the two concave mirror surfaces) in the enlarged combined image. The joined portion of the two concave mirror surfaces generates light scattering and flare, which makes the joined portion of the images noticeable.

SUMMARY OF THE INVENTION

The present invention provides an image display apparatus which is capable of displaying an image with a wide viewing angle by using the tiling technology, has a small thickness or a small size, and is capable of suppressing generation of light scattering and flare which make the joined portion of the images noticeable.

The present invention provides as an aspect thereof an image display apparatus that forms a first image and a second image of mutually different viewing angle areas of a display viewing angle to display a combined image of the first and second images joined to each other. The apparatus includes a first image-forming element configured to form a first original image, a second image-forming element configured to form a second original image, a first optical system configured to reflect a first light flux from the first image-forming element at least twice prior to introducing the first light flux to an exit pupil of the first optical system, and a second optical system configured to reflect a second light flux from the second image-forming element at least twice prior to introducing the second light flux to the first optical system. When a cross section where the first and second light fluxes are folded by reflection through the first and second optical systems is defined as a first cross section, the first optical system introduces the first light flux and the second light flux from the second optical system to the exit pupil such that first and second images, respectively corresponding to the first and second original images of the mutually different viewing angle areas, are formed in the first cross section.

Other aspects of the present invention will become apparent from the following description and the attached drawings.

DESCRIPTION OF THE EMBODIMENTS

Figure 1:
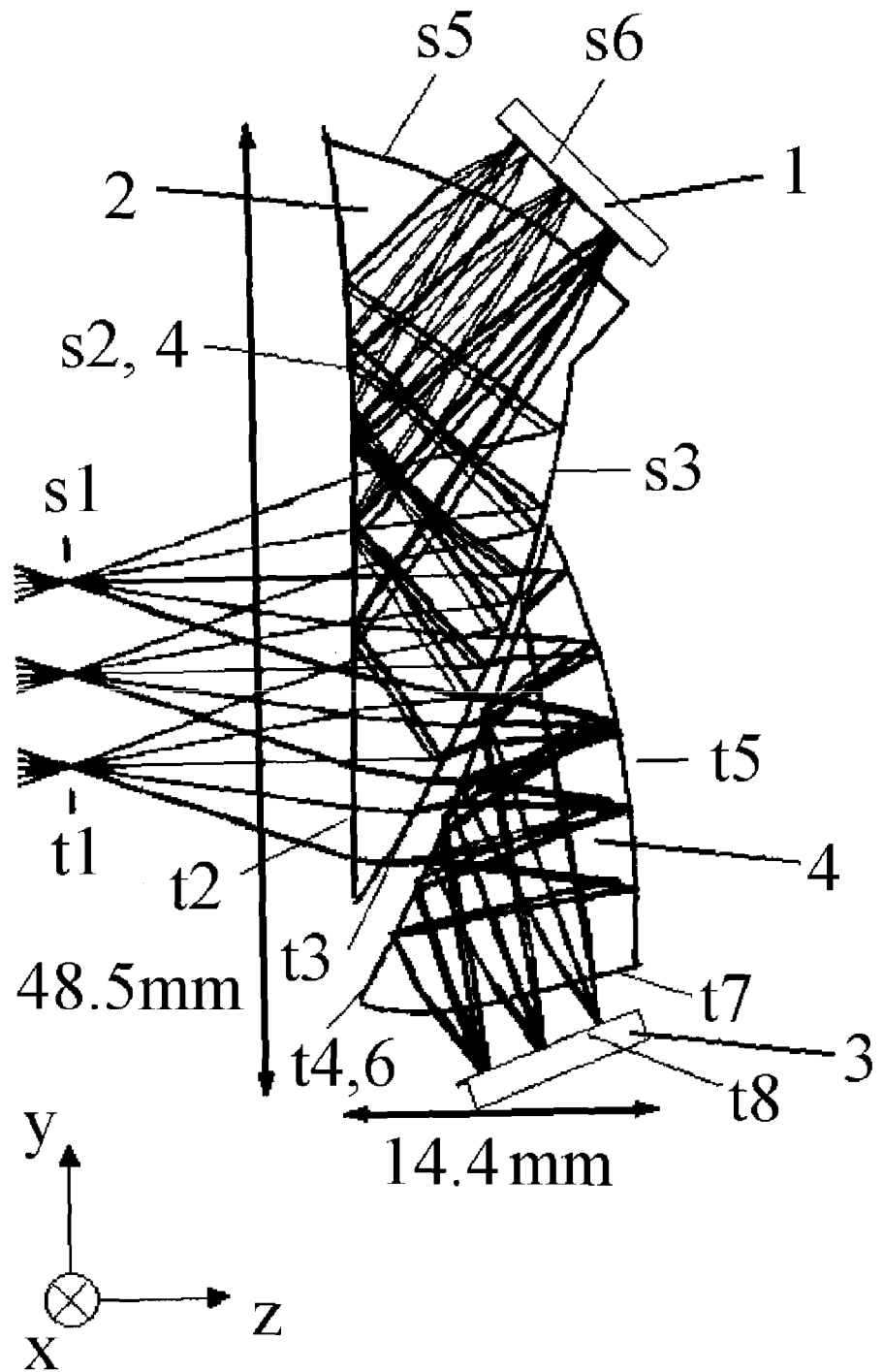
FIG. 1 is a local meridional cross-sectional view of an observation optical system of an HMD in accordance with a first embodiment (Embodiment 1) of the present invention.

Embodiments of the present invention will be described hereinafter with reference to the accompanying drawings.

Firstly, matters and features common to all of the embodiments will be described before features specific to individual embodiments are described.

1. An image display apparatus of each embodiment is used as an HMD. At a position of one exit pupil of an observation optical system of the HMD, one eye of an observer is placed. The HMD of each embodiment forms two images in mutually different viewing angle areas viewed from the one eye (exit pupil) to present to the one eye one enlarged combined image of these two images combined with each other.

Although description will be made of the observation optical system provided for one eye in each embodiment, the observation optical system is respectively provided for right and left eyes in an actual HMD.

2. The HMD of each embodiment includes a first image-forming element and a second image-forming element which respectively form a first original image and a second original image. Each image-forming element is constituted by a light modulating element such as a liquid crystal panel or an organic electroluminescence (EL) device, and forms an original image of a half area of one image corresponding to an input image signal from an image supply apparatus such as a personal computer, a DVD player or a television tuner. For example, the first image-forming element forms the first original image for an upper half area of one image corresponding to the input image signal, and the second image-forming element forms the second original image for an lower half area of the one image.

3. The HMD includes a first optical system that reflects a first light flux from the first image-forming element at least twice to introduce it to an exit pupil of the first optical system (that is, of the observation optical system), and a second optical system that reflects a second light flux from the second image-forming element at least twice to introduce it to the first optical system. Folding the light flux (optical path) from the original image (image-forming element) by the at least twice reflections in each of the first and second optical systems enables reduction of a thickness of the each optical system.

Each of the first and second optical systems may be constituted by a prism element filled thereinside with a medium having a refractive index larger than one. Using such a prism element can increase an optical power of each optical system, which makes it easy to provide a wide viewing angle. Each of the first and second optical systems may be constituted by a hollow element whose inside air area is surrounded by surfaces such as a reflective surface or a transmissive surface.

In each embodiment, in the first and second optical system, a cross section where the first and second light fluxes are folded by the at least twice reflections is defined as a "local meridional cross section (first cross section)". The first optical system introduces the first light flux and the second light flux from the second optical system to the exit pupil such that the first light flux and the second light flux respectively form a first image corresponding to the first original image and a second image corresponding to the second original image in mutually different viewing angle areas in the local meridional cross section.

In other words, the second light flux from the second original image (second image-forming element) after exiting from the second optical system is introduced to the exit pupil through the first optical system. Thus, providing a part shared by the first and second light fluxes in the first optical system enables suppression of generation of light scattering and flare at a joined portion (joined line) where the first and second images are joined to each other, which can make the joined line unnoticeable.

The first and second images formed in mutually different viewing angle areas by the first and second optical systems are joined to each other in the local meridional cross section to be presented as a combined image. As a result, the observation optical system, that is, the HMD can be miniaturized as compared with conventional HMDs forming a similar wide viewing angle by using one image-forming element and one optical system.

4. In each embodiment, in the first optical system, an optical surface including an effective area (first effective area) which reflects the first light flux and through which the second light flux from the second optical system enters the first optical system is referred to as a "first optical surface". Moreover, in the second optical system, an optical surface including an effective area (second effective area) which reflects the second light flux and through which the second light flux exits from the second optical system toward the first optical surface is referred to as a "second optical surface". It is preferable that the first and second optical systems be arranged such that, in the local meridional cross section, the first effective area in the first optical surface and the second effective area in the second optical surface are shifted to each other in a direction along the first and second optical surfaces.

Such Shifting of the first effective area in the first optical surface and the second effective area in the second optical surface enables reduction of a thickness or a size of the entire observation optical system constituted by the first and second optical systems.

For example (as described in Embodiments 1, 2, 4 and 5), in the local meridional cross section, the first and second optical systems may be arranged so as to be shifted in a direction in which the first effective area of the first optical surface recedes from the second image-forming element and the second effective area of the second optical surface recedes from the first image-forming element. This arrangement enables reduction of the thickness of the observation optical system when a thickness (size in a direction of a visual axis of an observer) of the first optical system or the second optical system corresponds to the thickness of the entire observation optical system.

Moreover, for example (as described in Embodiment 3), in the local meridional cross section, the first and second optical systems may be arranged so as to be shifted in a direction in which the first effective area of the first optical surface approaches the second image-forming element and the second effective area of the second optical surface approaches the first image-forming element. This arrangement enables reduction of a size of the entire observation optical system in the shift direction (vertical height thereof in Embodiment 3) while increasing the thickness of the observation optical system.

The first and second optical surfaces defined as described above are arranged adjacently to each other (facing each other) with the first and second effective areas shifted to each other. This arrangement enables compactly collective combination of the first and second optical systems, which can further reduce the thickness or size of the observation optical system (HMD).

5. In each embodiment, when each of the first and second optical systems is formed by a prism element, it is preferable to dispose an air layer between the first and second optical surfaces.

To reduce the thickness or size of the observation optical system constituted by the first and second optical systems as much as possible, it is preferable to join the first and second optical surfaces to each other. The joining of the first and second optical surfaces facilitates assembling of the observation optical system. However, when the first and second optical systems are respectively formed by the prism element and the second optical surface is used as an internal total reflection surface and a transmissive exit surface, the joining of the second optical surface to the first optical surface makes it impossible to obtain a necessary total reflection effect. In addition, replacing the internal total reflection surface with a half mirror surface reduces light utilization efficiency significantly (to about ¼) in the second optical system. Therefore, disposing the air layer between the first and second optical surfaces is preferable rather than joining them.

6. In each embodiment, it is preferable to form each of the first and second optical systems such that it has three optical surfaces including two reflective surfaces. For example, each of the first and second optical systems may be provided with an entrance surface as a first surface through which the light flux from the original image (image-forming element) enters the optical system, a reflective surface or an internal total reflection surface as a second surface which reflects the entering light flux, and a reflection surface as a third surface which reflects again the light flux reflected at the second surface. The second surface serves as an exit surface through which the light flux reflected at the third surface exits from the optical system. This configuration enables reduction of a size of each of the first and second optical systems, which can miniaturize the entire observation optical system.

7. In each embodiment, a cross section orthogonal to the meridional cross section is defined as a "local sagittal cross section (second cross section)".

It is preferable to set a focal length in the local sagittal cross section of the entire observation optical system constituted by the first and second optical systems shorter than that in the meridional cross section.

The first and second images respectively corresponding to the first and second original images are arranged on the local meridional cross section. Thus, when an aspect ratio of each of the first and second images is close to that of the enlarged combined image, it is preferable to increase an optical power (that is, to shorten the focal length) of the entire observation optical system in the local sagittal cross section to raise a magnification thereof in the local sagittal cross section.

On the contrary, the focal length in the meridional cross section of the entire observation optical system constituted by the first and second optical systems may be set shorter than that in the local sagittal cross section. When the aspect ratio of each of the first and second images is a horizontally long ratio such as 16:9 and that of the enlarged combined image is 4:3, it is preferable to increase an optical power (that is, to shorten the focal length) of the entire observation optical system in the local meridional cross section to raise a magnification thereof in the local meridional cross section.

A configuration may be employed in which a relay optical system causes the first and second light fluxes from the first and second original images to form an image once, and then the first and second optical systems causes the first and second light fluxes from the relay optical system to form the first and second images on the exit pupil.

8. Next, description will be made of definitions of a meridional cross section, a sagittal cross section, the local meridional cross section and the local sagittal cross section used in each embodiment.

In an optical system (coaxial optical system) that is not a decentered optical system, when a z axis is defined as an optical axis in a surface apex coordinate system of each optical surface, a y-z cross section is a conventional meridional cross section and an x-z cross section is a conventional sagittal cross section.

On the other hand, since the optical system in each embodiment is a decentered optical system, the local meridional cross section and the local sagittal cross section corresponding to the decentered optical system are newly defined. In each embodiment, optical surfaces constituting the observation optical system are referred to as "i-th surfaces (i=1, 2, 3, . . . ) in order from an exit pupil side. FIG. 1 shows the surface apex coordinate system at an exit pupil surface (s1, t1) that is a first surface of the observation optical system.

First, a light ray passing through a center of the enlarged combined image and a center of the exit pupil of the observation optical system is defined as a "central viewing angle principal ray (reference ray)". A cross section including an entering ray part and an exiting ray part of the central viewing angle principal ray on a hit point of each optical surface is defined as the "local meridional cross section". A cross section including the hit point of the each optical surface, being orthogonal to the local meridional cross section and being parallel to the conventional sagittal cross section of the surface apex coordinate system of the each optical surface is defined as the "local sagittal cross section".

In other words briefly, as mentioned above, in the first and second optical systems, a cross section in which each of the first and second light fluxes is folded by at least twice reflections corresponds to the local meridional cross section, and a cross section orthogonal to the local meridional cross section corresponds to the local sagittal cross section.

Embodiment 1

FIG. 1 is a cross-sectional view (local meridional cross sectional view) showing optical paths in an observation optical system of an HMD that is a first embodiment (Embodiment 1) of the present invention. Reference numeral 1 denotes a first image-forming element which forms a first original image. Reference numeral 2 denotes a first prism constituting a first optical system which introduces a first light flux from the first image-forming element 1 to an exit pupil s1 of the observation optical system (that is, of the first optical system).

Reference numeral 3 denotes a second image-forming element which forms a second original image. Reference numeral 4 denotes a second prism constituting a second optical system which introduces a second light flux from the second image-forming element 3 to the first prism 2.

The first light flux from the first image-forming element 1 (s6) enters the first prism 2 through a surface s5 thereof. The first light flux that has entered the first prism 2 is internally totally reflected at a surface s4, and then is reflected at a half mirror formed on a concave surface (first optical surface) s3 toward a surface s2. The surface s2 and the surface s4 are the same surface.

The first light flux that has exited from the first prism 2 through the surface s2 proceeds to the exit pupil s1, and then is introduced to an eyeball (one eye) of an observer which is placed at a position of the exit pupil s1. Thus, the first light flux forms an enlarged virtual image of the first original image (that is, a first image corresponding to the first original image) which can be observed at the position of the exit pupil s1 in a first viewing angle area of a display viewing angle of the HMD.

On the other hand, the second light flux from the second image-forming element 3 (t8) enters the second prism 4 through a surface t7 thereof. The second light flux that has entered the second prism 4 is internally totally reflected at a surface t6, and then is reflected at a metal reflective film, which is formed on a surface t5 and has a reflectance of 80% or more, toward a surface t4. The surface t4 and the surface t6 are the same surface (second optical surface).

The second light flux that has exited from the second prism 4 through the surface t4 enters the first prism 2 through a half mirror surface t3 (same surface as the surface s3) of the first prism 2, and then is transmitted through a surface t2 (same surface as the surface s2) of the first prism 2 to proceed to the exit pupil t1 (eyeball). Thus, the second light flux forms an enlarged virtual image of the second original image (that is, a second image corresponding to the second original image) which can be observed at a position of the exit pupil t1 (same position as that of the exit pupil s1) in a second viewing angle area of the display viewing angle. The second viewing angle area is adjacent to the first viewing angle area in the local meridional cross section.

All surfaces on the first and second prisms 2 and 4 are formed as free-form surfaces (non-rotationally symmetric surfaces).

The first and second prisms 2 and 4 are arranged in the local meridional cross section so as to be shifted to each other in a direction in which an effective area (first effective area) in the first optical surface s3 (t3) recedes from the second image-forming element 3 and an effective area (second effective area) in the second optical surface t4 (t6) recedes from the first image-forming element 1.

In the following description, a system constituted by the first image-forming element 1 and the first prism 2 is referred to as a "first prism system". A system constituted by the second image-forming element 3, and the second prism 4 and the first prism 2 is referred to as a "second prism system".

Table 1, Table 2 and Table 3 show a numerical example of this embodiment. How to read Tables 1 to 3 will be described later.

The first prism system shown in Table 1 uses a WVGA (800×480 pixels) image-forming element of 0.58 inches, and forms the first image in an area corresponding to a horizontal viewing angle of ±25° and a vertical viewing angle of 0-19.28°. The vertical viewing angle corresponds to the first viewing angle area in the local meridional cross section.

The second prism system shown in Tables 2 and 3 uses a WVGA (800×480 pixels) image-forming element of 0.58 inches, and forms the second image in an area corresponding to a horizontal viewing angle of ±25° and a vertical viewing angle of −19.28-0°. The vertical viewing angle corresponds to the second viewing angle area in the local meridional cross section.

Further, the entire observation optical system has a horizontal viewing angle of 50°, a vertical viewing angle of 38.56°, an eye relief of 15 mm and an exit pupil diameter of ϕ12 mm (10 mm in the vertical direction). A thickness of the entire observation optical system is 14.4 mm, and a height thereof is 48.5 mm.

Light fluxes for a horizontal viewing angle 0° among the light fluxes from the first and second original images are entirely introduced to the exit pupil by the first and second prism systems. Therefore, it is preferable that brightness at a portion for the horizontal viewing angle 0° in each of the first and second original images be set to be half of that at each other portion therein to make brightness of the entire combined image uniform.

Embodiment 2

Figure 2:
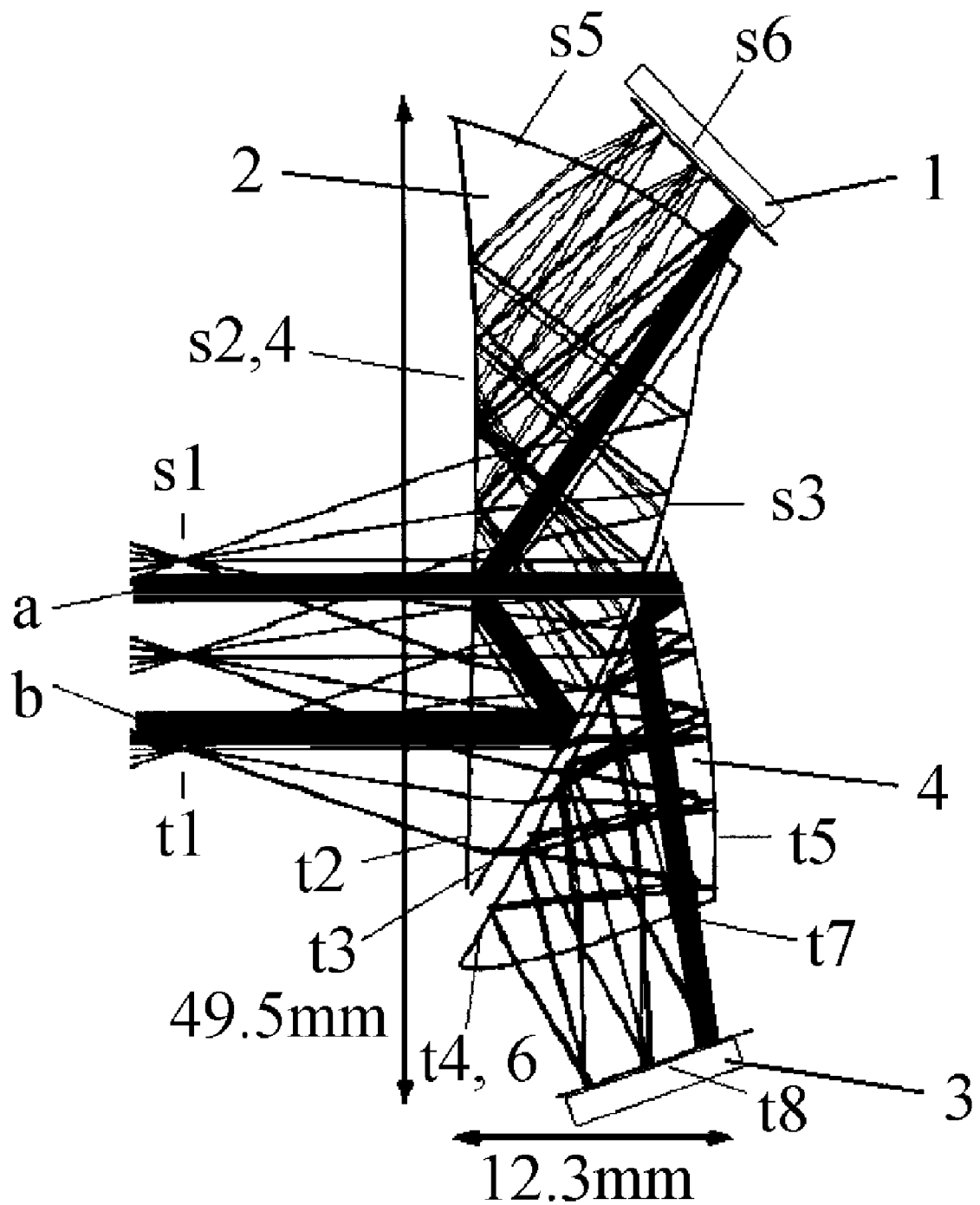
FIG. 2 is a local meridional cross-sectional view of an observation optical system of an HMD in accordance with a second embodiment (Embodiment 2) of the present invention.

FIG. 2 is a cross-sectional view (local meridional cross sectional view) showing optical paths in an observation optical system of an HMD that is a second embodiment (Embodiment 2) of the present invention. In Embodiment 2, components common to those of Embodiment 1 are denoted by the same reference numerals as those of Embodiment 1.

A first light flux from a first image-forming element 1 (s6) enters a first prism 2 through a surface s5 thereof. A first light flux that has entered the first prism 2 is internally totally reflected at a surface s4, and then is reflected at a half mirror formed on a concave surface (first optical surface) s3 toward a surface s2. The surface s2 and the surface s4 are the same surface.

The first light flux that has exited from the first prism 2 through the surface s2 proceeds to an exit pupil s1, and then is introduced to an eyeball (one eye) of an observer which is placed at a position of the exit pupil s1. Thus, the first light flux forms an enlarged virtual image of a first original image (that is, a first image corresponding to the first original image) which can be observed at the position of the exit pupil s1 in a first viewing angle area of a display viewing angle of the HMD.

On the other hand, a second light flux from a second image-forming element 3 (t8) enters a second prism 4 through a surface t7 thereof. The second light flux that has entered the second prism 4 is internally totally reflected at a surface t6, and then is reflected at a metal reflective film, which is formed on a surface t5 and has a reflectance of 80% or more, toward a surface t4. The surface t4 and the surface t6 are the same surface (second optical surface).

The second light flux that has exited from the second prism 4 through the surface t4 enters the first prism 2 through a half mirror surface t3 (same surface as the surface s3) of the first prism 2, and then is transmitted through a surface t2 (same surface as the surface s2) of the first prism 2 to proceed to the exit pupil t1 (eyeball). Thus, the second light flux forms an enlarged virtual image of a second original image (that is, a second image corresponding to the second original image) which can be observed at a position of the exit pupil t1 (same position as that of the exit pupil s1) in a second viewing angle area of the display viewing angle. The second viewing angle area is adjacent to the first viewing angle area in the local meridional cross section.

Also in this embodiment, all surfaces on the first and second prisms 2 and 4 are formed as free-form surfaces (non-rotationally symmetric surfaces).

The first and second prisms 2 and 4 are arranged in the local meridional cross section so as to be shifted to each other in a direction in which an effective area (first effective area) in the first optical surface s3 (t3) recedes from the second image-forming element 3 and an effective area (second effective area) in the second optical surface t4 (t6) recedes from the first image-forming element 1.

Table 4, Table 5 and Table 6 show a numerical example of this embodiment.

The first prism system shown in Table 4 uses a WVGA (800×480 pixels) image-forming element of 0.58 inches, and forms the first image in an area corresponding to a horizontal viewing angle of ±25° and a vertical viewing angle of 0-19.28°. The vertical viewing angle corresponds to the first viewing angle area in the local meridional cross section.

The second prism system shown in Tables 5 and 6 uses a WVGA (800×480 pixels) image-forming element of 0.58 inches, and forms the second image in an area corresponding to a horizontal viewing angle of ±25° and a vertical viewing angle of −19.28-0°. The vertical viewing angle corresponds to the second viewing angle area in the local meridional cross section.

Further, the entire observation optical system has a horizontal viewing angle of 50°, a vertical viewing angle of 38.56°, an eye relief of 15 mm and an exit pupil diameter of φ12 mm (10 mm in the vertical direction).

In Embodiment 1 described above, the light fluxes for the horizontal viewing angle 0° among the light fluxes from the first and second original images are entirely introduced to the exit pupil by the first and second prism systems.

However, on the exit pupil surface in the local meridional cross section, the light fluxes for the horizontal viewing angle 0° (hereinafter referred to as "central viewing angle light fluxes") from the first and second original images have to mutually overlap at the vicinity of the reference ray, but do not have to mutually overlap at a most peripheral part of the exit pupil. Therefore, this embodiment does not introduce a part of the central viewing angle light flux from the second prism system to the exit pupil surface while introducing thereto another part thereof up to a light ray shown by "a" in FIG. 2 corresponding to an image height of 76% with respect to 5 mm (100%) from the reference ray to the most peripheral part of the exit pupil.

On the other hand, as for the central viewing angle light flux from the first prism system, this embodiment introduces a part thereof up to a light ray shown by "b" in FIG. 2 corresponding to an image height of 93%, to the exit pupil surface.

Since most of the central viewing angle light flux is not blocked in the first prism system, optical data of this embodiment is the same as that of Embodiment 1. In other words, Table 1 and Table 4 show the same data. On the other hand, since the center viewing angle light flux is largely blocked in the second prism system, a thickness of the entire observation optical system is significantly reduced to 12.3 mm (a height thereof is 49.5 mm), which is different from Embodiment 1.

It is preferable to adjust brightness at a portion for the horizontal viewing angle 0° in each of the first and second original images depending on a blocked light amount such that the brightness at that portion in the first original image is set to half of that at each other portion therein, and the brightness at that portion in the second original image is set to about 40% of that at each other portion therein.

Embodiment 3

Figure 3:
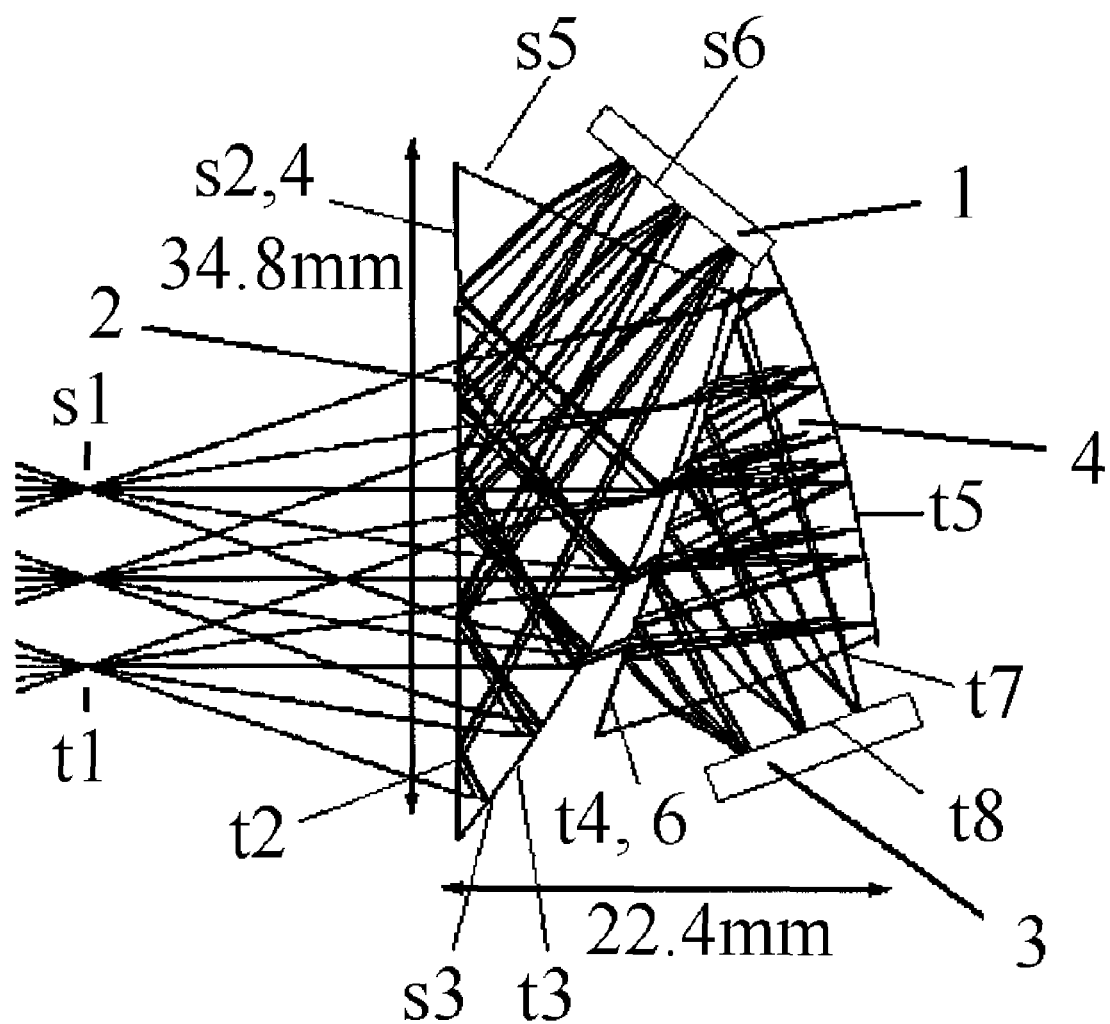
FIG. 3 is a local meridional cross-sectional view of an observation optical system of an HMD in accordance with a third embodiment (Embodiment 3) of the present invention.

FIG. 3 is a cross-sectional view (local meridional cross sectional view) showing optical paths in an observation optical system of an HMD that is a third embodiment (Embodiment 3) of the present invention. In Embodiment 3, components having the same functions as those of Embodiment 1 are denoted by the same reference numerals as those of Embodiment 1.

In this embodiment, first and second prisms 2 and 4 are arranged in the local meridional cross section so as to be shifted to each other in a direction in which an effective area (first effective area) in a first optical surface approaches a second image-forming element 3 and an effective area (second effective area) in a second optical surface approaches a first image-forming element 1, which is different from Embodiments 1 and 2.

A first light flux from the first image-forming element 1 (s6) enters the first prism 2 through a surface s5 thereof. The first light flux that has entered the first prism 2 is internally totally reflected at a surface s4, and then is reflected at a half mirror formed on a concave surface (first optical surface) s3 toward a surface s2. The surface s2 and the surface s4 are the same surface.

The first light flux that has exited from the first prism 2 through the surface s2 proceeds to an exit pupil s1 and then is introduced to an eyeball (one eye) of an observer which is placed at a position of the exit pupil s1. Thus, the first light flux forms an enlarged virtual image of a first original image (that is, a first image corresponding to the first original image) which can be observed at the position of the exit pupil s1 in a first viewing angle area of a display viewing angle of the HMD.

On the other hand, a second light flux from the second image-forming element 3 (t8) enters the second prism 4 through a surface t7 thereof. The second light flux that has entered the second prism 4 is internally totally reflected at a surface t6, and then is reflected at a metal reflective film, which is formed on a surface t5 and has a reflectance of 80% or more, toward a surface t4. The surface t4 and the surface t6 are the same surface (second optical surface).

The second light flux that has exited from the second prism 4 through the surface t4 enters the first prism 2 through a half mirror surface t3 (same surface as the surface s3) of the first prism 2, and then is transmitted through a surface t2 (same surface as the surface s2) of the first prism 2 to proceed to the exit pupil t1 (eyeball). Thus, the second light flux forms an enlarged virtual image of a second original image (that is, a second image corresponding to the second original image) which can be observed at a position of the exit pupil t1 (same position as that of the exit pupil s1) in a second viewing angle area of the display viewing angle. The second viewing angle area is adjacent to the first viewing angle area in the local meridional cross section.

Also in this embodiment, all surfaces on the first and second prisms 2 and 4 are formed as free-form surfaces (non-rotationally symmetric surfaces).

Table 7, Table 8 and Table 9 show a numerical example of this embodiment.

The first prism system shown in Table 7 uses a WVGA (800×480 pixels) image-forming element of 0.58 inches, and forms the first image in an area corresponding to a horizontal viewing angle of ±25° and a vertical viewing angle of −19.28-

0°. The vertical viewing angle corresponds to the first viewing angle area in the local meridional cross section.

The second prism system shown in Tables 8 and 9 uses a WVGA (800×480 pixels) image-forming element of 0.58 inches, and forms the second image in an area corresponding to a horizontal viewing angle of ±25° and a vertical viewing angle of 0-19.28°. The vertical viewing angle corresponds to the second viewing angle area in the local meridional cross section. The first and second viewing angle areas are vertically opposite to those in Embodiments 1 and 2.

Further, the entire observation optical system has a horizontal viewing angle of 50°, a vertical viewing angle of 38.56°, an eye relief of 15 mm and an exit pupil diameter of φ12 mm (10 mm in the vertical direction). A thickness of the entire observation optical system is 22.4 mm which is larger than those of Embodiments 1 and 2, but a height thereof is 34.8 mm which is smaller than those of Embodiments 1 and 2.

As in Embodiment 1, the light fluxes for the horizontal viewing angle 0° among the light fluxes from the first and second original images are entirely introduced to the exit pupil by the first and second prism systems. Therefore, it is preferable that brightness at a portion for the horizontal viewing angle 0° in each of the first and second original images be set to be half of that at each other portion therein to make brightness of the entire combined image uniform.

Embodiment 4

Figure 4:
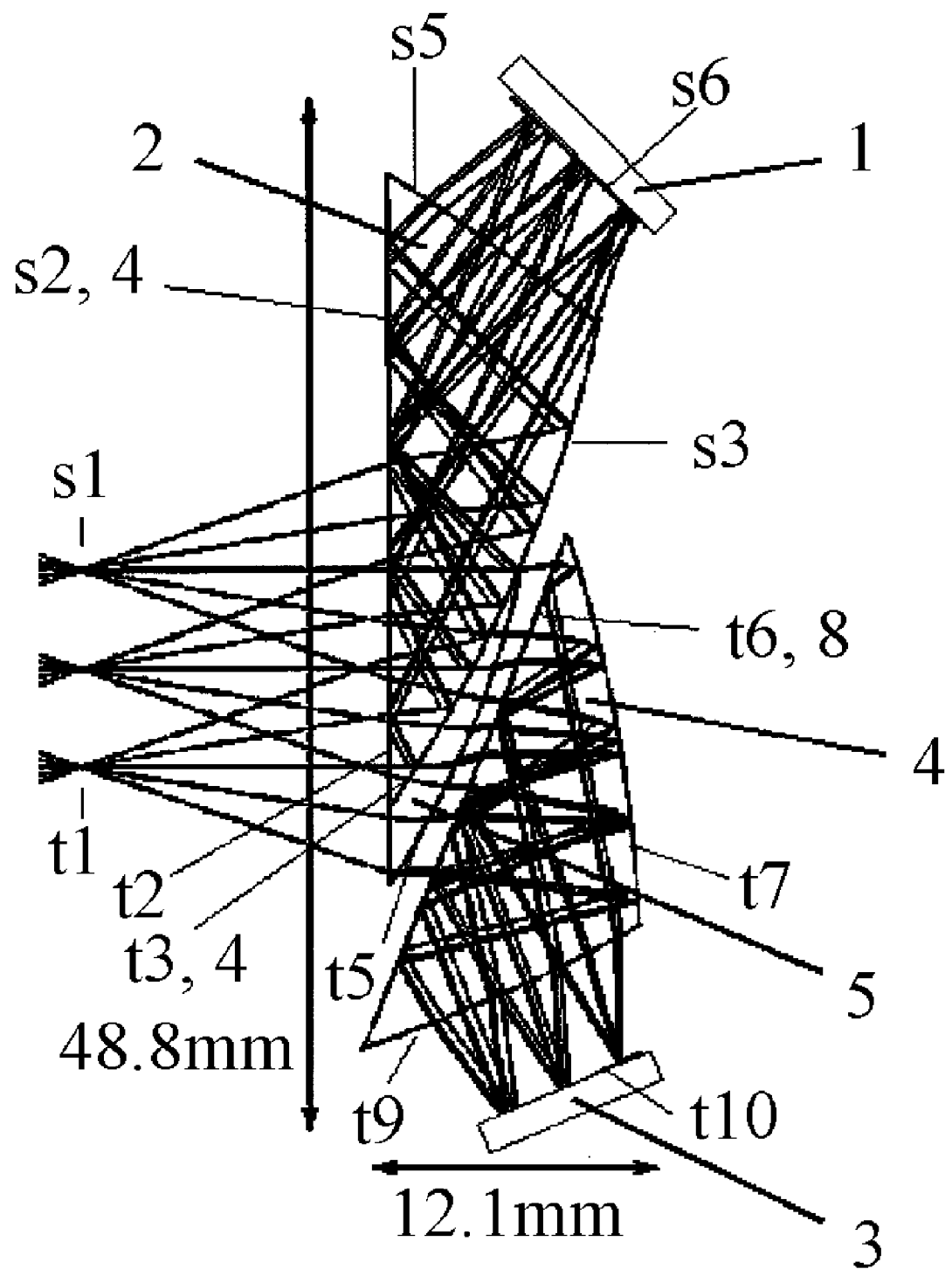
FIG. 4 is a local meridional cross-sectional view of an observation optical system of an HMD in accordance with a fourth embodiment (Embodiment 4) of the present invention.

FIG. 4 is a cross-sectional view (local meridional cross sectional view) showing optical paths in an observation optical system of an HMD that is a fourth embodiment (Embodiment 4) of the present invention. Embodiment 4 is a modified example of Embodiments 1 and 2. In Embodiment 4, components having the same functions as those of Embodiments 1 and 2 are denoted by the same reference numerals as those of Embodiments 1 and 2.

Embodiments 1 and 2 have the observation optical system constituted by only the first and second prisms 2 and 4. However, Embodiment 4 uses another prism (third prism) 5 with the first and second prisms 2 and 4 to further reduce the thickness of the observation optical system. The third prism 5 is joined to part of a half mirror surface s3 of a first prism 2.

The third prism 5 joined to the first prism 2 may be regarded as a prism which constitutes a first optical system together with the first prism 2.

A first light flux from a first image-forming element 1 (s6) enters the first prism 2 through a surface s5 thereof. The first light flux that has entered the first prism 2 is internally totally reflected at a surface s4, and then is reflected at a half mirror formed on a concave surface (first optical surface) s3 toward a surface s2. The surface s2 and the surface s4 are the same surface.

The first light flux that has exited from the first prism 2 through the surface s2 proceeds to an exit pupil s1, and then is introduced to an eyeball (one eye) of an observer which is placed at a position of the exit pupil s1. Thus, the first light flux forms an enlarged virtual image of a first original image (that is, a first image corresponding to the first original image) which can be observed at the position of the exit pupil s1 in a first viewing angle area of a display viewing angle of the HMD.

On the other hand, a second light flux from a second image-forming element 3 (t10) enters the second prism 4 through a surface t9 thereof. The second light flux that has entered the second prism 4 is internally totally reflected at a surface t8, and then is reflected at a metal reflective film, which is formed on a surface t7 and has a reflectance of 80% or more, toward a surface t6. The surface t8 and the surface t6 are the same surface (second optical surface).

The second light flux that has exited from the second prism 4 through the surface t6 is transmitted through surfaces t5 and t4 of the third prism 5, and then enters the first prism 2 through a half mirror surface t3 (same surface as the surface s3) of the first prism 2. Further, the second light flux is transmitted through a surface t2 (same surface as the surface s2) of the first prism 2 to proceed to the exit pupil t1 (eyeball). Thus, the second light flux forms an enlarged virtual image of a second original image (that is, a second image corresponding to the second original image) which can be observed at a position of the exit pupil t1 (same position as that of the exit pupil s1) in a second viewing angle area of the display viewing angle. The second viewing angle area is adjacent to the first viewing angle area in the local meridional cross section.

In this embodiment, a part of the second light flux that has exited from the second prism 4 (hereinafter referred to as a "third light flux") is transmitted through the third prism 5 to proceed to the exit pupil without being transmitted through the first prism 2.

Although FIG. 4 shows an area of the surface t2 through which the third light flux is transmitted as a surface formed on the surface t2, the area may be formed on a different surface from the surface t2.

In this embodiment, all surfaces on the first, second and third prisms 2, 4 and 5 are formed as free-form surfaces (non-rotationally symmetric surfaces).

Table 10, Table 11 and Table 12 show a numerical example of this embodiment.

The first prism system shown in Table 10 uses an image-forming element of 0.8 inches, and forms the first image in an area corresponding to a horizontal viewing angle of ±25° and a vertical viewing angle of 0-19.28°. The vertical viewing angle corresponds to the first viewing angle area in the local meridional cross section.

The second prism system shown in Tables 11 and 12 uses an image-forming element of 0.67 inches, and forms the second image in an area corresponding to a horizontal viewing angle of ±25° and a vertical viewing angle of −19.28-0°. The vertical viewing angle corresponds to the second viewing angle area in the local meridional cross section.

Further, the entire observation optical system has a horizontal viewing angle of 50°, a vertical viewing angle of 38.56°, an eye relief of 15 mm and an exit pupil diameter of φ12 mm (10 mm in the vertical direction). A thickness of the entire observation optical system is 12.1 mm which is smaller than those of Embodiments 1 and 2, and a height thereof is 48.8 mm.

As in Embodiment 1, the light fluxes for the horizontal viewing angle 0° among the light fluxes from the first and second original images are entirely introduced to the exit pupil by the first and second prism systems. Therefore, it is preferable that brightness at a portion for the horizontal viewing angle 0° in each of the first and second original images be set to be half of that at each other portion therein to make brightness of the entire combined image uniform.

Embodiment 5

Figure 5:
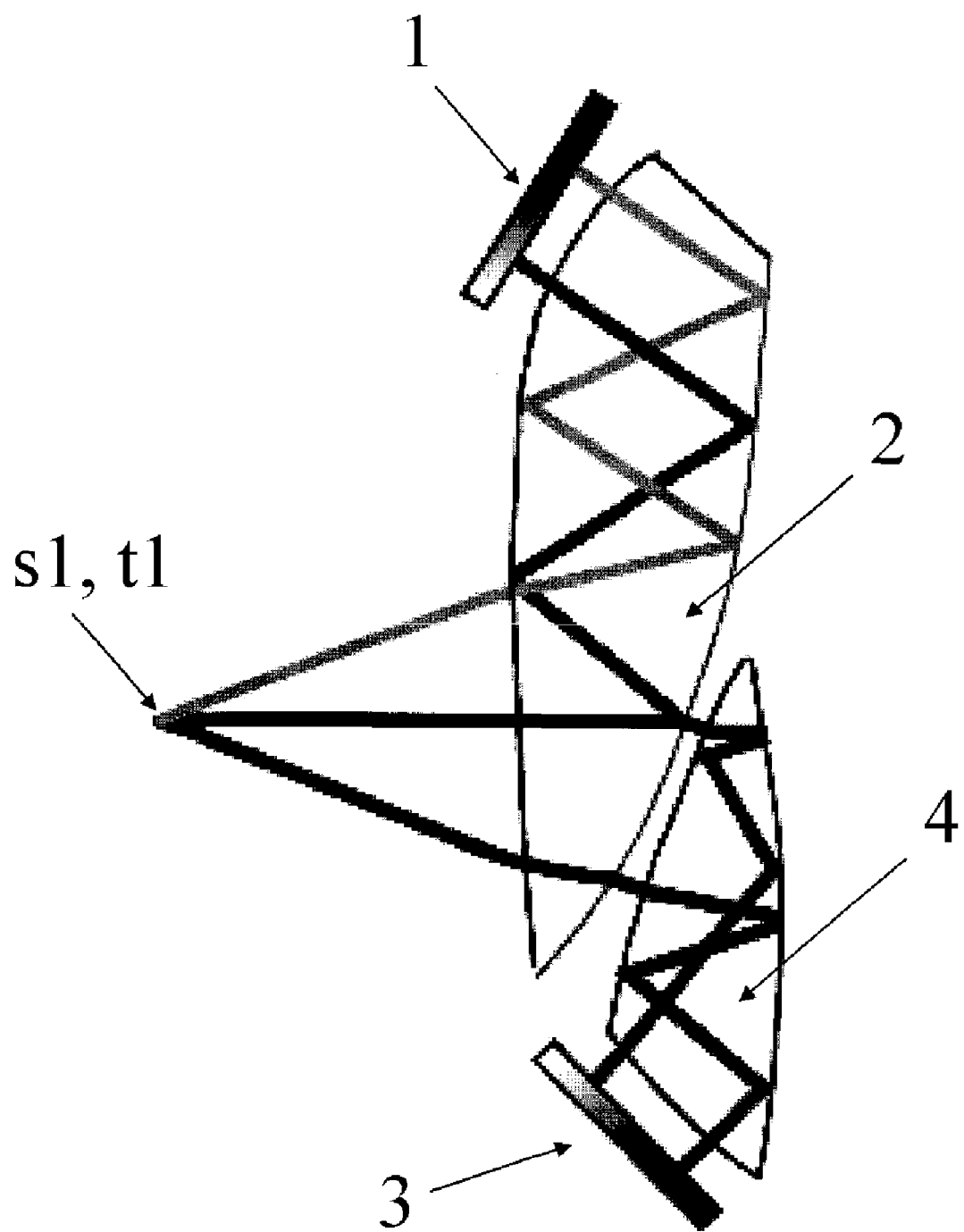
FIG. 5 is a local meridional cross-sectional view of an observation optical system of an HMD in accordance with a fifth embodiment (Embodiment 5) of the present invention.

FIG. 5 is a cross-sectional view (local meridional cross sectional view) showing optical paths in an observation optical system of an HMD that is a fifth embodiment (Embodiment 5) of the present invention. Embodiment 5 is a modified example of Embodiments 1 and 2. In Embodiment 5, components having the same functions as those of Embodiments 1 and 2 are denoted by the same reference numerals as those of Embodiments 1 and 2.

This embodiment uses a first prism 2 and a second prism 4 respectively having three reflective surfaces. A first light flux from a first image-forming element 1 and a second light flux from a second image-forming element 3 are respectively reflected three times in the first prism 2 and the second prism 4 to be introduced to an exit pupil (s1, t1). As in Embodiments 1 and 2, the second light flux that has exited from the second prism 4 is introduced to the exit pupil t1 through the first prism 2.

Such a configuration makes it possible to dispose the first and second image-forming elements 1 and 3 at positions closer to the exit pupil than the first and the second prisms 2 and 4, respectively. Therefore, a further reduction of the thickness of the first and second prism systems can be achieved.

Hereinafter, description will be made of the local meridional cross section shown in FIGS. 1 to 5 and how to read Tables 1 to 12 showing the numerical examples of Embodiments 1 to 4.

Each of the numerical examples uses a local paraxial theory, which will be described first.

FIGS. 1 to 5 are local meridional cross sectional views of the above-described embodiments, each of which shows the surface apex coordinate system of the first surface (exit pupil s1, t1). In each embodiment, since an apex of each surface is decentered by shifting in a y axis direction and by tilting around an x axis, the conventional meridional cross section is identical to the local meridional cross section.

However, the conventional sagittal cross section of each surface is different from the local sagittal cross section thereof. The conventional meridional and sagittal cross sections described above are defined in a conventional paraxial theory, but the local meridional and sagittal cross sections are defined in the local paraxial theory described below. Further, description will be made below of definitions of a local curvature radius, a local surface distance, a local focal length and a local refractive power.

Each embodiment defines the light ray passing through the center of the enlarged combined image and the center of the exit pupil of the observation optical system as the central viewing angle principal ray (reference ray). Further, each embodiment does not use a conventional curvature radius, a surface distance, a focal length and a refractive index based on a surface apex, but uses the local curvature radius, the local surface distance, the local focal length and the local refractive power based on the hit points (incident points) of the reference ray on each surface.

The local curvature radius means a curvature radius of an optical surface at a local hit point thereon (in other words, a curvature radius on the local meridional cross section and a curvature radius on the local sagittal cross section). The local surface distance means a distance (distance on the reference ray without air conversion) between two hit points on a current surface and a next surface.

The local focal length is a value calculated by a conventional focal length calculation method (paraxial ray tracing) from the local curvature radius, refractive indexes at front and back of the surface, and the local surface distance. The local refractive power (optical power) is an inverse of the local focal length.

The column of "general-paraxial" in the tables for the numerical examples shows conventional curvature radii "ry" and "rx", a conventional surface distance "d", conventional decentered amounts "shift" and "tilt", and a refractive index "nd" and an Abbe constant "vd" of a medium forming the surface for a d-line. The curvature radii "ry" and "rx" are a curvature radius in the meridional cross section and a curvature radius in the sagittal cross section, respectively. The surface distance shows a distance in a direction parallel to the surface apex coordinate system of the first surface. As for the decentered amounts, a parallel decentered amount of an apex of each surface and a tilting decentered amount (degrees) thereof with respect to the surface apex coordinate system of the first surface on the meridional cross section are respectively shown by "shift" and "tilt". On the other hand, the column of "local-paraxial" in the tables shows local curvature radii "local-ry" and "local-ry", a refractive index "nd" of a medium forming the surface (when the surface is a reflective surface, a sign of the refractive index is reversed), a local surface distance (when the surface is a reflective surface, a sign of the surface distance is reversed) "local-d", and local focal lengths "local-fx" and "local-fy".

In the tables, "FFS" and "FFST" show that the surface is a free-form surface (non-rotationally symmetric surface). A surface to which "M" is added at the left end of each table is a reflective surface, and a reversed sign is added to the refractive index "nd" of the reflective surface.

Each table shows numerical data obtained by reverse ray tracing from the exit pupil s1 (t1) toward the image-forming element (s6 and t8 in FIGS. 1 to 3, s6 and t10 in FIG. 4).

Expressions for definitions of "FFS" and "FFST" are shown below. The following expressions define "FFS" and "FFST" in the surface apex coordinate system in each surface.

FFS:

$$z = (1/R)*(x^2+y^2)/[1+\{1-(1+c1)*(1/R)^2*(x^2+y^2)\}^{(1/2)}] + c5*(x^2-y^2) + c6*(-1+2*x^2+2*y^2) + c10*(-2*y+3*x^2*y+3*y^3) + c11*(3*x^2*y-y^3) + c12*(x^4-6*x^2*y^2+y^4) + c13*(-3*x^2+4*x^4+3*y^2-4*y^4) + c14*(1-6*x^2+6*x^4-6*y^2+12*x^2*y^2+6*y^4) + c20*(3*y-12*x^2*y+10*x^4*y-12*y^3+20*x^2*y^3+10*y^5) + c21*(-12*x^2*y+15*x^4*y+4*y^3+10*x^2*y^3-5*y^5) + c22*(5*x^4*y-10*x^2*y^3+y^5) + c23*(x^6-15*x^4*y^2+15*x^2*y^4-y^6) + c24*(-5*x^4+6*x^6+30*x^2*y^2-30*x^4*y^2-5*y^4-30*x^2*y^4+6*y^6) + c25*(6*x^2-20*x^4+15*x^6-6*y^2+15*x^4*y^2+20*y^4-15*x^2*y^4-15*y^6) + c26*(-1+12*x^2-30*x^4+20*x^6+12*y^2-60*x^2*y^2+60*x^4*y^2-30*y^4+60*x^2*y^4+20*y^6) + \ldots$$

FFST:

$$z = \{(1/Rx)*x^2+(1/Ry)*y^2\}/[1+\{1-(1+cx1)*(1/Rx)^2*x^2-(1+cy1)*(1/Ry)^2*y^2\}^{(1/2)}] + c2+c4*y+c5*(x^2-y^2) + c6*(-1+2*x^2+2*y^2) + c10*(-2*y+3*x^2*y+3*y^3) + c11*(3*x^2*y-y^3) + c12*(x^4-6*x^2*y^2+y^4) + c13*(-3*x^2+4*x^4+3*y^2-4*y^4) + c14*(1-6*x^2+6*x^4-6*y^2+12*x^2*y^2+6*y^4) + c20*(3*y-12*x^2*y+10*x^4*y-12*y^3+20*x^2*y^3+10*y^5) + c21*(-12*x^2*y+15*x^4*y+4*y^3+10*x^2*y^3-5*y^5) + c22*(5*x^4*y-10*x^2*y^3+y^5) + c23*(x^6-15*x^4*y^2+15*x^2*y^4-y^6) + c24*(-5*x^4+6*x^6+30*x^2*y^2-30*x^4*y^2-5*y^4-30*x^2*y^4+6*y^6) + c25*(6*x^2-20*x^4+15*x^6-6*y^2+15*x^4*y^2+20*y^4-15*x^2*y^4-15*y^6) + c26*(-1+12*x^2-30*x^4+20*x^6+12*y^2-60*x^2*y^2+60*x^4*y^2-30*y^4 60*x^2*y^4+20*y^6) + \ldots$$

In the above expressions, cx, cy, c1 and c5, ... are free-form surface coefficients. "e±M" means "×10$^{\pm M}$".

For the free-form surface, the free-form surface coefficients include a coefficient relating to the paraxial theory, so that values of the meridional and sagittal cross-sectional curvature radii ry and rx in the conventional paraxial theory are not identical to actual meridional and sagittal cross-sectional curvature radii ry and rx on a surface apex. Thus, each table also shows a point (0,0), in other words, the actual meridional and sagittal cross-sectional curvature radii ry and rx on the surface apex.

Moreover, in the column of "local-paraxial", coordinates of the hit point on each surface (the surface apex is defined as (0,0)) and viewing angles "ωy" and "ωx" at the exit pupil are shown.

TABLE 1

| | | n | ry | rx | d | shift | tilt | nd | vd |
|---|---|---|---|---|---|---|---|---|---|
| | | s 1 | 0.00000 | 0.00000 | 14.584 | 0.000 | 0.000 | 1.000 | |
| FFS | | s 2 | −0.00045 | −0.00045 | −7.147 | −31.145 | 1.031 | 1.571 | 33.80 |
| FFST-M | | s 3 | −104.41245 | −74.91246 | 7.147 | −21.138 | −42.169 | −1.571 | 33.80 |
| FFS-M | | s 4 | −0.00045 | −0.00045 | 12.730 | −31.145 | 1.031 | 1.571 | 33.80 |
| FFST | | s 5 | −16.21653 | −14.84897 | −0.561 | 20.665 | 44.899 | 1.000 | |
| | | s 6 | 0.00000 | 0.00000 | 0.000 | 24.188 | 43.595 | 1.000 | |
| | | s 7 | 0.00000 | 0.00000 | 0.000 | 24.188 | 43.595 | 1.000 | |

| | | | | | | |
|---|---|---|---|---|---|---|
| FFS s 2 | $c1 = -1.7730e+018$ | $c5 = 1.2010e-005$ | $c6 = 3.3245e-004$ | $c10 = 2.9865e-006$ | $c11 = 3.8193e-006$ | |
| | $c12 = -4.3699e-008$ | $c13 = -2.0550e-008$ | $c14 = -4.2795e-009$ | $c20 = -1.2119e-010$ | $c21 = -1.7505e-010$ | |
| | $c22 = -5.2395e-010$ | $c23 = 1.1506e-011$ | $c24 = 3.4617e-012$ | $c25 = 1.5594e-012$ | $c26 = -2.3281e-012$ | |
| FFST s 3 | $cx = -1.8408e+000$ | $cy = -5.2440e-001$ | | | | |
| | $c5 = -4.4788e-004$ | $c6 = -3.1415e-004$ | $c10 = -4.9066e-006$ | $c11 = -4.6568e-006$ | $c12 = 8.5270e-008$ | |
| | $c13 = 1.2908e-007$ | $c14 = 2.0603e-009$ | $c20 = -6.0969e-012$ | $c21 = 1.4316e-009$ | $c22 = 1.8798e-009$ | |
| | $c23 = -3.6448e-011$ | $c24 = -2.6962e-011$ | $c25 = 2.0854e-012$ | $c26 = 4.9700e-012$ | | |
| FFS s 4 | $c1 = -1.7730e+018$ | $c5 = 1.2010e-005$ | $c6 = 3.3245e-004$ | $c10 = 2.9865e-006$ | $c11 = 3.8193e-006$ | |
| | $c12 = -4.3699e-008$ | $c13 = -2.0550e-008$ | $c14 = -4.2795e-009$ | $c20 = -1.2119e-010$ | $c21 = -1.7505e-010$ | |
| | $c22 = -5.2395e-010$ | $c23 = 1.1506e-011$ | $c24 = 3.4617e-012$ | $c25 = 1.5594e-012$ | $c26 = -2.3281e-012$ | |
| FFST s 5 | $cx = -2.6471e+000$ | $cy = -9.9446e-001$ | | | | |
| | $c5 = -7.3384e-003$ | $c6 = -3.0580e-003$ | $c10 = 1.9086e-004$ | $c11 = 4.5586e-004$ | $c12 = 4.5655e-006$ | |
| | $c13 = 1.8848e-006$ | $c14 = 2.9489e-006$ | $c20 = -2.4773e-007$ | $c21 = -5.7055e-007$ | $c22 = -1.0315e-006$ | |
| | $c23 = -1.5135e-008$ | $c24 = 9.7153e-009$ | $c25 = 9.1935e-009$ | $c26 = 7.2212e-009$ | | |

| n | point (y, x) | ry | rx |
|---|---|---|---|
| s 2 | (0.000, 0.000) | 766.021 | 738.698 |
| s 3 | (0.000, 0.000) | −100.629 | −64.507 |
| s 4 | (0.000, 0.000) | 766.021 | 738.698 |
| s 5 | (0.000, 0.000) | −16.879 | −10.604 |

(local - paraxial)

| | | n | local-ry | local-rx | local-fy | local-fx | local-d | nd |
|---|---|---|---|---|---|---|---|---|
| | | s 1 | 0.00000 | 0.00000 | 0.000 | 0.000 | 14.743 | 1.000 |
| FFS | | s 2 | 5408.13762 | 342.23714 | 9473.001 | 599.469 | 6.961 | 1.571 |
| FFST-M | | s 3 | −65.94789 | −58.31321 | 20.990 | 18.560 | −10.339 | −1.571 |
| FFS-M | | s 4 | −412.63901 | 305.45805 | −131.338 | 97.224 | 17.921 | 1.571 |
| FFST | | s 5 | −16.94052 | −10.71980 | 29.673 | 18.777 | 2.033 | 1.000 |
| | | s 6 | 0.00000 | 0.00000 | 0.000 | 0.000 | 0.000 | 1.000 |
| | | s 7 | 0.00000 | 0.00000 | 0.000 | 0.000 | 0.000 | 1.000 |

| n | hitpoint (y, x) |
|---|---|
| s 1 | (0.000, 0.000) |
| s 2 | (31.137, 0.000) |
| s 3 | (25.199, 0.000) |
| s 4 | (38.869, 0.000) |
| s 5 | (0.258, 0.000) |
| s 6 | (−2.534, 0.000) |
| s 7 | (−2.534, 0.000) |

| local_fy (1-7) | local_fx (1-7) | Wy | Wx |
|---|---|---|---|
| 20.299 | 17.326 | 0.00 -> 19.28 | −25.00 -> 25.00 |

TABLE 2

(general - paraxial)

| | | n | ry | rx | d | shift | tilt | nd | vd |
|---|---|---|---|---|---|---|---|---|---|
| | | t 1 | 0.00000 | 0.00000 | 14.584 | 0.000 | 0.000 | 1.000 | |
| FFS | | t 2 | −0.00045 | −0.00045 | −7.147 | −31.145 | 1.031 | 1.571 | 33.80 |
| FFST | | t 3 | −104.41245 | −74.91246 | 8.039 | −21.138 | −42.169 | 1.000 | |
| FFS | | t 4 | −267.95885 | −267.95885 | 12.196 | −15.916 | −28.379 | 1.571 | 33.80 |
| FFST-M | | t 5 | −52.38686 | −61.54358 | −12.196 | −0.547 | 13.901 | −1.571 | 33.80 |
| FFS-M | | t 6 | −267.95885 | −267.95885 | 13.854 | −15.916 | −28.379 | 1.571 | 33.80 |
| FFST | | t 7 | −56.79975 | −21.73919 | −3.153 | −15.673 | −75.176 | 1.000 | |

TABLE 2-continued

|  |  |  |  |  |  |  |  |
|---|---|---|---|---|---|---|---|
|  | t 8 | 0.00000 | 0.00000 | 0.000 | −19.171 | −68.756 | 1.000 |
|  | t 9 | 0.00000 | 0.00000 | 0.000 | −19.171 | −68.756 | 1.000 |

| | | | | | | |
|---|---|---|---|---|---|---|
| FFS | t 2 | $c1 = -1.7730e+018$ | $c5 = 1.2010e-005$ | $c6 = 3.3245e-004$ | $c10 = 2.9865e-006$ | $c11 = 3.8193e-006$ |
| | | $c12 = -4.3699e-008$ | $c13 = -2.0550e-008$ | $c14 = -4.2795e-009$ | $c20 = -1.2119e-010$ | $c21 = -1.7505e-010$ |
| | | $c22 = -5.2395e-010$ | $c23 = 1.1506e-011$ | $c24 = 3.4617e-012$ | $c25 = 1.5594e-012$ | $c26 = -2.3281e-012$ |
| FFST | t 3 | $cx = -1.8408e+000$ | $cy = -5.2440e-001$ | | | |
| | | $c5 = -4.4788e-004$ | $c6 = -3.1415e-004$ | $c10 = -4.9066e-006$ | $c11 = -4.6568e-006$ | $c12 = 8.5270e-008$ |
| | | $c13 = 1.2908e-007$ | $c14 = 2.0603e-009$ | $c20 = -6.0969e-012$ | $c21 = 1.4316e-009$ | $c22 = 1.8798e-009$ |
| | | $c23 = -3.6448e-011$ | $c24 = -2.6962e-011$ | $c25 = 2.0854e-012$ | $c26 = 4.9700e-012$ | |
| FFS | t 4 | $c1 = 4.0700e+001$ | $c5 = 4.9700e-004$ | $c6 = -7.4377e-004$ | $c10 = -8.0835e-006$ | $c11 = 2.0156e-006$ |
| | | $c12 = 1.2103e-007$ | $c13 = -5.7226e-008$ | $c14 = -5.2522e-008$ | $c20 = 2.7822e-010$ | $c21 = -3.2507e-009$ |
| | | $c22 = 6.8408e-010$ | $c23 = 1.3045e-010$ | $c24 = 4.1939e-011$ | $c25 = -3.2358e-011$ | $c26 = 8.4041e-012$ |
| FFST | t 5 | $cx = -8.5008e-001$ | $cy = 1.5763e+000$ | | | |
| | | $c5 = -1.5793e-004$ | $c6 = -7.8492e-004$ | $c10 = -1.4106e-005$ | $c11 = -6.2640e-006$ | $c12 = 6.7908e-007$ |
| | | $c13 = 1.5120e-009$ | $c14 = -2.8410e-008$ | $c20 = -8.7835e-009$ | $c21 = -2.2568e-009$ | $c22 = 2.1243e-009$ |
| | | $c23 = 6.1796e-010$ | $c24 = -3.0309e-010$ | $c25 = -1.6826e-010$ | $c26 = -1.5308e-011$ | |
| FFS | t 6 | $c1 = 4.0700e+001$ | $c5 = 4.9700e-004$ | $c6 = -7.4377e-004$ | $c10 = -8.0835e-006$ | $c11 = 2.0156e-006$ |
| | | $c12 = 1.2103e-007$ | $c13 = -5.7226e-008$ | $c14 = -5.2522e-008$ | $c20 = 2.7822e-010$ | $c21 = -3.2507e-009$ |
| | | $c22 = 6.8408e-010$ | $c23 = 1.3045e-010$ | $c24 = 4.1939e-011$ | $c25 = -3.2358e-011$ | $c26 = 8.4041e-012$ |
| FFST | t 7 | $cx = 2.8199e-001$ | $cy = -2.2832e+001$ | | | |
| | | $c5 = -9.0353e-003$ | $c6 = -1.5979e-003$ | $c10 = -1.1333e-004$ | $c11 = -3.8090e-004$ | $c12 = -1.6178e-005$ |
| | | $c13 = -1.0798e-005$ | $c14 = -1.9437e-006$ | $c20 = 3.7848e-007$ | $c21 = 2.8442e-007$ | $c22 = -2.2219e-007$ |
| | | $c23 = 5.2775e-008$ | $c24 = 2.8055e-008$ | $c25 = 3.8789e-008$ | $c26 = 1.8164e-008$ | |

| n | point (y, x) | ry | rx |
|---|---|---|---|
| t 2 | (0.000, 0.000) | 766.021 | 738.698 |
| t 3 | (0.000, 0.000) | −100.629 | −64.507 |
| t 4 | (0.000, 0.000) | −129.858 | −175.070 |
| t 5 | (0.000, 0.000) | −45.637 | −50.751 |
| t 6 | (0.000, 0.000) | −129.858 | −175.070 |
| t 7 | (0.000, 0.000) | −167.550 | −14.210 |

TABLE 3

(local - paraxial)

| | n | local-ry | local-rx | local-fy | local-fx | local-d | nd |
|---|---|---|---|---|---|---|---|
| | t 1 | 0.00000 | 0.00000 | 0.000 | 0.000 | 14.743 | 1.000 |
| FFS | t 2 | 5408.13762 | 342.23714 | 9473.001 | 599.469 | 6.961 | 1.571 |
| FFST | t 3 | −65.94789 | −58.31321 | 115.516 | 102.143 | 1.036 | 1.000 |
| FFS | t 4 | −142.54672 | −131.07420 | −249.688 | −229.592 | 4.740 | 1.571 |
| FFST-M | t 5 | −45.21221 | −50.43251 | 14.391 | 16.052 | −6.694 | −1.571 |
| FFS-M | t 6 | −120.28202 | −140.83103 | −38.284 | −44.825 | 14.403 | 1.571 |
| FFST | t 7 | −207.15736 | −16.85960 | 362.861 | 29.532 | 2.507 | 1.000 |
| | t 8 | 0.00000 | 0.00000 | 0.000 | 0.000 | 0.000 | 1.000 |
| | t 9 | 0.00000 | 0.00000 | 0.000 | 0.000 | 0.000 | 1.000 |

| n | hitpoint (y, x) |
|---|---|
| t 1 | (0.000, 0.000) |
| t 2 | (31.137, 0.000) |
| t 3 | (25.199, 0.000) |
| t 4 | (17.626, 0.000) |
| t 5 | (0.928, 0.000) |
| t 6 | (14.396, 0.000) |
| t 7 | (−3.225, 0.000) |
| t 8 | (1.026, 0.000) |
| t 9 | (1.026, 0.000) |

| local_fy (1-9) | local_fx (1-9) | Wy | Wx |
|---|---|---|---|
| 17.971 | 17.072 | −19.28 -> 0.00 | −25.00 -> 25.00 |

TABLE 4

(general - paraxial)

| | n | ry | rx | d | shift | tilt | nd | vd |
|---|---|---|---|---|---|---|---|---|
| | s 1 | 0.00000 | 0.00000 | 14.584 | 0.000 | 0.000 | 1.000 | |
| FFS | s 2 | −0.00045 | −0.00045 | −7.147 | −31.145 | 1.031 | 1.571 | 33.80 |
| FFST-M | s 3 | −104.41245 | −74.91246 | 7.147 | −21.138 | −42.169 | −1.571 | 33.80 |

TABLE 4-continued

| | | | | | | | | |
|---|---|---|---|---|---|---|---|---|
| FFS-M | s 4 | −0.00045 | −0.00045 | 12.730 | −31.145 | 1.031 | 1.571 | 33.80 |
| FFST | s 5 | −16.21653 | −14.84897 | −0.561 | 20.665 | 44.899 | 1.000 | |
| | s 6 | 0.00000 | 0.00000 | 0.000 | 24.188 | 43.595 | 1.000 | |
| | s 7 | 0.00000 | 0.00000 | 0.000 | 24.188 | 43.595 | 1.000 | |

| | | | | | | |
|---|---|---|---|---|---|---|
| FFS | s 2 | $c1 = -1.7730e+018$ | $c5 = 1.2010e-005$ | $c6 = 3.3245e-004$ | $c10 = 2.9865e-006$ | $c11 = 3.8193e-006$ |
| | | $c12 = -4.3699e-008$ | $c13 = -2.0550e-008$ | $c14 = -4.2795e-009$ | $c20 = -1.2119e-010$ | $c21 = -1.7505e-010$ |
| | | $c22 = -5.2395e-010$ | $c23 = 1.1506e-011$ | $c24 = 3.4617e-012$ | $c25 = 1.5594e-012$ | $c26 = -2.3281e-012$ |
| FFST | s 3 | $cx = -1.8408e+000$ | $cy = -5.2440e-001$ | | | |
| | | $c5 = -4.4788e-004$ | $c6 = -3.1415e-004$ | $c10 = -4.9066e-006$ | $c11 = -4.6568e-006$ | $c12 = 8.5270e-008$ |
| | | $c13 = 1.2908e-007$ | $c14 = 2.0603e-009$ | $c20 = -6.0969e-012$ | $c21 = 1.4316e-009$ | $c22 = 1.8798e-009$ |
| | | $c23 = -3.6448e-011$ | $c24 = -2.6962e-011$ | $c25 = 2.0854e-012$ | $c26 = 4.9700e-012$ | |
| FFS | s 4 | $c1 = -1.7730e+018$ | $c5 = 1.2010e-005$ | $c6 = 3.3245e-004$ | $c10 = 2.9865e-006$ | $c11 = 3.8193e-006$ |
| | | $c12 = -4.3699e-008$ | $c13 = -2.0550e-008$ | $c14 = -4.2795e-009$ | $c20 = -1.2119e-010$ | $c21 = -1.7505e-010$ |
| | | $c22 = -5.2395e-010$ | $c23 = 1.1506e-011$ | $c24 = 3.4617e-012$ | $c25 = 1.5594e-012$ | $c26 = -2.3281e-012$ |
| FFST | s 5 | $cx = -2.6471e+000$ | $cy = -9.9446e-001$ | | | |
| | | $c5 = -7.3384e-003$ | $c6 = -3.0580e-003$ | $c10 = 1.9086e-004$ | $c11 = 4.5586e-004$ | $c12 = 4.5655e-006$ |
| | | $c13 = 1.8848e-006$ | $c14 = 2.9489e-006$ | $c20 = -2.4773e-007$ | $c21 = -5.7055e-007$ | $c22 = -1.0315e-006$ |
| | | $c23 = -1.5135e-008$ | $c24 = 9.7153e-009$ | $c25 = 9.1935e-009$ | $c26 = 7.2212e-009$ | |

| n | point (y, x) | ry | rx |
|---|---|---|---|
| s2 | (0.000, 0.000) | 766.021 | 738.698 |
| s3 | (0.000, 0.000) | −100.629 | −64.507 |
| s4 | (0.000, 0.000) | 766.021 | 738.698 |
| s5 | (0.000, 0.000) | −16.079 | −10.604 |

(local - paraxial)

| | n | local-ry | local-rx | local-fy | local-fx | local-d | nd |
|---|---|---|---|---|---|---|---|
| | s 1 | 0.00000 | 0.00000 | 0.000 | 0.000 | 14.743 | 1.000 |
| FFS | s 2 | 5408.13762 | 342.23714 | 9473.001 | 599.469 | 6.961 | 1.571 |
| FFST-M | s 3 | −65.94789 | −58.31321 | 20.990 | 18.560 | −10.339 | −1.571 |
| FFS-M | s 4 | −412.63901 | 305.45805 | −131.338 | 97.224 | 17.921 | 1.571 |
| FFST | s 5 | −16.94052 | −10.71980 | 29.673 | 18.777 | 2.033 | 1.000 |
| | s 6 | 0.00000 | 0.00000 | 0.000 | 0.000 | 0.000 | 1.000 |
| | s 7 | 0.00000 | 0.00000 | 0.000 | 0.000 | 0.000 | 1.000 |

| n | hitpoint (y, x) |
|---|---|
| s 1 | (0.000, 0.000) |
| s 2 | (31.137, 0.000) |
| s 3 | (25.199, 0.000) |
| s 4 | (38.869, 0.000) |
| s 5 | (0.258, 0.000) |
| s 6 | (−2.534, 0.000) |
| s 7 | (−2.534, 0.000) |

| local_fy (1-7) | local_fx (1-7) | Wy | Wx |
|---|---|---|---|
| 20.299 | 17.326 | 0.00 -> 19.28 | −25.00 -> 25.00 |

TABLE 5

(general - paraxial)

| | n | ry | rx | d | shift | tilt | nd | vd |
|---|---|---|---|---|---|---|---|---|
| | t 1 | 0.00000 | 0.00000 | 14.584 | 0.000 | 0.000 | 1.000 | |
| FFS | t 2 | −0.00045 | −0.00045 | −7.147 | −31.145 | 1.031 | 1.571 | 33.80 |
| FFST | t 3 | −104.41245 | −74.91246 | 6.563 | −21.138 | −42.169 | 1.000 | |
| FFS | t 4 | −267.95885 | −267.95885 | 12.250 | −15.916 | −32.000 | 1.571 | 33.80 |
| FFST-M | t 5 | −52.38686 | −61.54358 | −12.250 | −0.547 | 11.000 | −1.571 | 33.80 |
| FFS-M | t 6 | −267.95885 | −267.95885 | 13.000 | −15.916 | −32.000 | 1.571 | 33.80 |
| FFST | t 7 | −56.79975 | −21.73919 | −0.823 | −12.500 | −70.000 | 1.000 | |
| | t 8 | 0.00000 | 0.00000 | 0.000 | −20.000 | −70.000 | 1.000 | |
| | t 9 | 0.00000 | 0.00000 | 0.000 | −20.000 | −70.000 | 1.000 | |

| | | | | | | |
|---|---|---|---|---|---|---|
| FFS | t 2 | $c1 = -1.7730e+018$ | $c5 = 1.2010e-005$ | $c6 = 3.3245e-004$ | $c10 = 2.9865e-006$ | $c11 = 3.8193e-006$ |
| | | $c12 = -4.3699e-008$ | $c13 = -2.0550e-008$ | $c14 = -4.2795e-009$ | $c20 = -1.2119e-010$ | $c21 = -1.7505e-010$ |
| | | $c22 = -5.2395e-010$ | $c23 = 1.1506e-011$ | $c24 = 3.4617e-012$ | $c25 = 1.5594e-012$ | $c26 = -2.3281e-012$ |
| FFST | t 3 | $cx = -1.8408e+000$ | $cy = -5.2440e-001$ | | | |
| | | $c5 = -4.4788e-004$ | $c6 = -3.1415e-004$ | $c10 = -4.9066e-006$ | $c11 = -4.6568e-006$ | $c12 = 8.5270e-008$ |
| | | $c13 = 1.2908e-007$ | $c14 = 2.0603e-009$ | $c20 = -6.0969e-012$ | $c21 = 1.4316e-009$ | $c22 = 1.8798e-009$ |
| | | $c23 = -3.6448e-011$ | $c24 = -2.6962e-011$ | $c25 = 2.0854e-012$ | $c26 = 4.9700e-012$ | |

TABLE 5-continued

| | | | | | | |
|---|---|---|---|---|---|---|
| FFS | t 4 | c1 = 4.0700e+001 | c5 = 4.9700e−004 | c6 = −7.4377e−004 | c10 = −8.0835e−006 | c11 = 2.0156e−006 |
| | | c12 = 1.2103e−007 | c13 = −5.7226e−008 | c14 = −5.2522e−008 | c20 = 2.7822e−010 | c21 = −3.2507e−009 |
| | | c22 = 6.8408e−010 | c23 = 1.3045e−010 | c24 = 4.1939e−011 | c25 = −3.2358e−011 | c26 = 8.4041e−012 |
| FFST | t 5 | cx = −8.5008e−001 | cy = 1.5763e+000 | | | |
| | | c5 = −1.5793e−004 | c6 = −7.8492e−004 | c10 = −1.4106e−005 | c11 = −6.2640e−006 | c12 = 6.7908e−007 |
| | | c13 = 1.5120e−009 | c14 = −2.8410e−008 | c20 = −8.7835e−009 | c21 = −2.2568e−009 | c22 = 2.1243e−009 |
| | | c23 = 6.1796e−010 | c24 = −3.0309e−010 | c25 = −1.6826e−010 | c26 = −1.5308e−011 | |
| FFS | t 6 | c1 = 4.0700e+001 | c5 = 4.9700e−004 | c6 = −7.4377e−004 | c10 = −8.0835e−006 | c11 = 2.0156e−006 |
| | | c12 = 1.2103e−007 | c13 = −5.7226e−008 | c14 = −5.2822e−008 | c20 = 2.7822e−010 | c21 = −3.2507e−009 |
| | | c22 = 6.8408e−010 | c23 = 1.3045e−010 | c24 = 4.1939e−011 | c25 = −3.2358e−011 | c26 = 8.4041e−012 |
| FFST | t 7 | cx = 2.8199e−001 | cy = −2.2832e+001 | | | |
| | | c5 = −9.0353e−003 | c6 = −1.5979e−003 | c10 = −1.1333e−004 | c11 = −3.8090e−004 | c12 = −1.6178e−005 |
| | | c13 = −1.0798e−005 | c14 = −1.9437e−006 | c20 = 3.7848e−007 | c21 = 2.8442e−007 | c22 = −2.2219e−007 |
| | | c23 = 5.2775e−008 | c24 = 2.8055e−008 | c25 = 3.8789e−008 | c26 = 1.8164e−008 | |

| n | point (y, x) | ry | rx |
|---|---|---|---|
| t 2 | (0.000, 0.000) | 766.021 | 738.698 |
| t 3 | (0.000, 0.000) | −100.629 | −64.507 |
| t 4 | (0.000, 0.000) | −129.858 | −175.070 |
| t 5 | (0.000, 0.000) | −45.637 | −50.751 |
| t 6 | (0.000, 0.000) | −129.858 | −175.070 |
| t 7 | (0.000, 0.000) | −167.550 | −14.210 |

TABLE 6

(local - paraxial)

| | n | local-ry | local-rx | local-fy | local-fx | local-d | nd |
|---|---|---|---|---|---|---|---|
| | t 1 | 0.00000 | 0.00000 | 0.000 | 0.000 | 14.743 | 1.000 |
| FFS | t 2 | 5408.13762 | 342.23714 | 9473.001 | 599.469 | 6.961 | 1.571 |
| FFST | t 3 | −65.94789 | −58.31321 | 115.516 | 102.143 | 0.730 | 1.000 |
| FFS | t 4 | −147.83375 | −129.77836 | −258.949 | −227.322 | 3.704 | 1.571 |
| FFST-M | t 5 | −45.31770 | −50.51573 | 14.424 | 16.079 | −5.005 | −1.571 |
| FFS-M | t 6 | −127.86965 | −136.24037 | −40.699 | −43.364 | 11.863 | 1.571 |
| FFST | t 7 | −185.12987 | −15.64849 | 324.277 | 27.410 | 6.786 | 1.000 |
| | t 8 | 0.00000 | 0.00000 | 0.000 | 0.000 | 0.000 | 1.000 |
| | t 9 | 0.00000 | 0.00000 | 0.000 | 0.000 | 0.000 | 1.000 |

| n | hitpoint (y, x) |
|---|---|
| t 1 | (0.000, 0.000) |
| t 2 | (31.137, 0.000) |
| t 3 | (25.199, 0.000) |
| t 4 | (18.065, 0.000) |
| t 5 | (0.701, 0.000) |
| t 6 | (15.904, 0.000) |
| t 7 | (−1.957, 0.000) |
| t 8 | (1.023, 0.000) |
| t 9 | (1.023, 0.000) |

| local_fy (1-9) | local_fx (1-9) | Wy | Wx |
|---|---|---|---|
| 17.984 | 15.720 | −19.28 -> 0.00 | −25.00 -> 25.00 |

TABLE 7

(general - paraxial)

| | n | ry | rx | d | shift | tilt | nd | vd |
|---|---|---|---|---|---|---|---|---|
| | s 1 | 0.00000 | 0.00000 | 19.958 | 0.000 | 0.000 | 1.000 | |
| FFS | s 2 | −11509.8135 | −11509.8135 | −7.409 | −15.000 | 0.081 | 1.571 | 33.80 |
| FFS-M | s 3 | −74.29617 | −74.29617 | 7.409 | −22.083 | −47.233 | −1.571 | 33.80 |
| FFS-M | s 4 | −11509.8135 | −11509.8135 | 9.810 | −15.000 | 0.081 | 1.571 | 33.80 |
| FFS | s 5 | 107.86546 | 107.86546 | −1.706 | 17.500 | 65.670 | 1.000 | |
| | s 6 | 0.00000 | 0.00000 | 0.000 | 23.551 | 50.193 | 1.000 | |
| | s 7 | 0.00000 | 0.00000 | 0.000 | 23.551 | 50.193 | 1.000 | |

| | | | | | | |
|---|---|---|---|---|---|---|
| FFS | s 2 | c1 = 0.0000e+000 | c5 = 1.9303e−005 | c6 = 5.4642e−006 | c10 = −1.6115e−008 | c11 = 1.5557e−007 |
| | | c12 = −6.5950e−011 | c13 = 7.7906e−010 | c14 = 6.6117e−011 | c20 = −8.5295e−013 | c21 = 7.2798e−012 |
| | | c22 = 4.7977e−011 | c23 = −1.6304e−012 | c24 = 8.5196e−014 | c25 = 2.3462e−014 | c26 = 9.1337e−015 |

TABLE 7-continued

| | | | | | | |
|---|---|---|---|---|---|---|
| FFS | s 3 | c1 = 6.2037e−003 | c5 = −2.3975e−005 | c6 = −1.5859e−005 | c10 = −5.9876e−008 | c11 = −2.4942e−007 |
| | | c12 = 2.6971e−009 | c13 = −9.1860e−010 | c14 = −4.9221e−010 | c20 = −3.2654e−012 | c21 = −1.8371e−011 |
| | | c22 = 2.8901e−011 | c23 = −2.5447e−013 | c24 = 2.4001e−013 | c25 = −4.0866e−014 | c26 = −3.9952e−014 |
| FFS | s 4 | c1 = 0.0000e+000 | c5 = 1.9303e−005 | c6 = 5.4642e−006 | c10 = −1.6115e−008 | c11 = 1.5557e−007 |
| | | c12 = −6.5950e−011 | c13 = 7.7906e−010 | c14 = 6.6117e−011 | c20 = −8.5295e−013 | c21 = 7.2798e−012 |
| | | c22 = 4.7977e−011 | c23 = −1.6304e−012 | c24 = 8.5196e−014 | c25 = 2.3462e−014 | c26 = 9.1337e−015 |
| FFS | s 5 | c1 = −7.6017e+002 | c5 = −1.3738e−004 | c6 = −1.8320e−004 | c10 = −1.1382e−006 | c11 = 1.4961e−005 |
| | | c12 = −8.8320e−007 | c13 = −2.3323e−007 | c14 = −2.2607e−007 | c20 = 4.8803e−008 | c21 = 2.5859e−008 |
| | | c22 = 9.5942e−008 | c23 = −4.2245e−009 | c24 = −9.6717e−010 | c25 = −2.0303e−010 | c26 = −4.2686e−010 |

| n | point (y, x) | ry | rx |
|---|---|---|---|
| s 2 | (0.000, 0.000) | −9649.969 | −37841.842 |
| s 3 | (0.000, 0.000) | −74.211 | −73.686 |
| s 4 | (0.000, 0.000) | −9649.969 | −37841.842 |
| s 5 | (0.000, 0.000) | 113.455 | 120.958 |

(local - paraxial)

| | n | local-ry | local-rx | local-fy | local-fx | local-d | nd |
|---|---|---|---|---|---|---|---|
| | s 1 | 0.00000 | 0.00000 | 0.000 | 0.000 | 19.924 | 1.000 |
| FFS | s 2 | −7917.91994 | −52858.3234 | −13869.19 | −92587.68 | 9.009 | 1.571 |
| FFS-M | s 3 | −74.55560 | −68.09478 | 23.730 | 21.674 | −14.667 | −1.571 |
| FFS-M | s 4 | −7744.31453 | −22197.2236 | −2464.929 | −7065.129 | 9.822 | 1.571 |
| FFS | s 5 | 445.99642 | 175.95069 | −781.216 | −308.199 | 4.660 | 1.000 |
| | s 6 | 0.00000 | 0.00000 | 0.000 | 0.000 | 0.000 | 1.000 |
| | s 7 | 0.00000 | 0.00000 | 0.000 | 0.000 | 0.000 | 1.000 |

| n | hitpoint (y, x) |
|---|---|
| s 1 | (0.000, 0.000) |
| s 2 | (15.000, 0.000) |
| s 3 | (27.030, 0.000) |
| s 4 | (26.549, 0.000) |
| s 5 | (4.305, 0.000) |
| s 6 | (−1.406, 0.000) |
| s 7 | (−1.406, 0.000) |

| local_fy (1-7) | local_fx (1-7) | Wy | Wx |
|---|---|---|---|
| 24.157 | 22.155 | −19.28 -> 0.00 | −25.00 -> 25.00 |

TABLE 8

(general - paraxial)

| | n | ry | rx | d | shift | tilt | nd | vd |
|---|---|---|---|---|---|---|---|---|
| | t 1 | 0.00000 | 0.00000 | 19.958 | 0.000 | 0.000 | 1.000 | |
| FFS | t 2 | −11509.8135 | −11509.8135 | −7.409 | −15.000 | 0.081 | 1.571 | 33.80 |
| FFS | t 3 | −74.29617 | −74.29617 | 16.428 | −22.083 | −47.233 | 1.000 | |
| FFS | t 4 | −659.54643 | −659.54643 | 7.053 | −3.673 | −18.999 | 1.571 | 33.80 |
| FFS-M | t 5 | −65.95171 | −65.95171 | −7.053 | 18.519 | 26.196 | −1.571 | 33.80 |
| FFS-M | t 6 | −659.54643 | −659.54643 | 2.973 | −3.673 | −18.999 | 1.571 | 33.80 |
| FFS | t 7 | −200.62619 | −200.62619 | 6.085 | −6.986 | −70.854 | 1.000 | |
| | t 8 | 0.00000 | 0.00000 | 0.000 | −8.513 | −68.712 | 1.000 | |
| | t 9 | 0.00000 | 0.00000 | 0.000 | −8.513 | −68.712 | 1.000 | |

| | | | | | | |
|---|---|---|---|---|---|---|
| FFS | t 2 | c1 = 0.0000e+000 | c5 = 1.9303e−005 | c6 = 5.4642e−006 | c10 = −1.6115e−008 | c11 = 1.5557e−007 |
| | | c12 = −6.5950e−011 | c13 = 7.7906e−010 | c14 = 6.6117e−011 | c20 = −8.5295e−013 | c21 = 7.2798e−012 |
| | | c22 = 4.7977e−011 | c23 = −1.6304e−012 | c24 = 8.5196e−014 | c25 = 2.3462e−014 | c26 = 9.1337e−015 |
| FFS | t 3 | c1 = 6.2037e−003 | c5 = −2.3975e−005 | c6 = −1.5859e−005 | c10 = −5.9876e−008 | c11 = −2.4942e−007 |
| | | c12 = 2.6971e−009 | c13 = −9.1860e−010 | c14 = −4.9221e−010 | c20 = −3.2654e−012 | c21 = −1.8371e−011 |
| | | c22 = 2.8901e−011 | c23 = −2.5447e−013 | c24 = 2.4001e−013 | c25 = −4.0866e−014 | c26 = −3.9952e−014 |
| FFS | t 4 | c1 = 2.9365e+001 | c5 = 5.2026e−006 | c6 = 5.4117e−006 | c10 = 1.3379e−007 | c11 = 1.7377e−007 |
| | | c12 = −4.2445e−009 | c13 = −4.7526e−010 | c14 = 1.0325e−009 | c20 = 1.9745e−011 | c21 = 1.1260e−011 |
| | | c22 = −7.5141e−011 | c23 = 2.0085e−012 | c24 = −5.3479e−013 | c25 = −5.1601e−013 | c26 = 1.7101e−013 |
| FFS | t 5 | c1 = −1.0984e−004 | c5 = −9.7854e−006 | c6 = −4.3974e−006 | c10 = 3.0682e−008 | c11 = 6.2141e−008 |
| | | c12 = −1.0973e−009 | c13 = −5.7290e−010 | c14 = −2.6124e−010 | c20 = −3.9684e−012 | c21 = 4.0784e−012 |
| | | c22 = 7.0431e−011 | c23 = 1.6364e−012 | c24 = −2.9343e−013 | c25 = −2.7221e−013 | c26 = 7.4616e−014 |
| FFS | t 6 | c1 = 2.9365e+001 | c5 = 5.2026e−006 | c6 = 5.4117e−006 | c10 = 1.3379e−007 | c11 = 1.7377e−007 |
| | | c12 = −4.2445e−009 | c13 = −4.7526e−010 | c14 = 1.0325e−009 | c20 = 1.9745e−011 | c21 = 1.1260e−011 |
| | | c22 = −7.5141e−011 | c23 = 2.0085e−012 | c24 = −5.3479e−013 | c25 = −5.1601e−013 | c26 = 1.7101e−013 |

TABLE 8-continued

| | | | | | | |
|---|---|---|---|---|---|---|
| FFS | t 7 | c1 = 1.2877e+002 | c5 = 2.1515e−005 | c6 = 3.8628e−006 | c10 = −1.7170e−006 | c11 = −2.3520e−006 |
| | | c12 = 4.8048e−008 | c13 = 5.2006e−008 | c14 = 2.3396e−009 | c20 = −3.7362e−010 | c21 = −1.4582e−010 |
| | | c22 = −2.1411e−009 | c23 = −2.3026e−010 | c24 = 1.6099e−011 | c25 = 1.4481e−011 | c26 = 1.7600e−012 |

| n | point (y, x) | ry | rx |
|---|---|---|---|
| t 2 | (0.000, 0.000) | −9649.969 | −37841.842 |
| t 3 | (0.000, 0.000) | −74.211 | −73.686 |
| t 4 | (0.000, 0.000) | −664.466 | −673.786 |
| t 5 | (0.000, 0.000) | −65.960 | −65.791 |
| t 6 | (0.000, 0.000) | −664.466 | −673.786 |
| t 7 | (0.000, 0.000) | −199.533 | −202.994 |

TABLE 9

(local - paraxial)

| | n | local-ry | local-rx | local-fy | local-fx | local-d | nd |
|---|---|---|---|---|---|---|---|
| | t 1 | 0.00000 | 0.00000 | 0.000 | 0.000 | 19.924 | 1.000 |
| FFS | t 2 | −7917.91994 | −52858.3234 | −13869.19 | −92587.68 | 9.009 | 1.571 |
| FFS | t 3 | −74.55560 | −68.09478 | 130.593 | 119.276 | 1.525 | 1.000 |
| FFS | t 4 | −666.27352 | −677.78957 | −1167.058 | −1187.230 | 11.381 | 1.571 |
| FFS-M | t 5 | −65.96333 | −63.30935 | 20.995 | 20.151 | −12.998 | −1.571 |
| FFS-M | t 6 | −665.05804 | −674.69662 | −211.681 | −214.748 | 5.145 | 1.571 |
| FFS | t 7 | −199.16989 | −202.59513 | 348.870 | 354.870 | 3.943 | 1.000 |
| | t 8 | 0.00000 | 0.00000 | 0.000 | 0.000 | 0.000 | 1.000 |
| | t 9 | 0.00000 | 0.00000 | 0.000 | 0.000 | 0.000 | 1.000 |

| n | hitpoint (y, x) |
|---|---|
| t 1 | (0.000, 0.000) |
| t 2 | (15.000, 0.000) |
| t 3 | (27.030, 0.000) |
| t 4 | (4.377, 0.000) |
| t 5 | (−18.104, 0.000) |
| t 6 | (1.070, 0.000) |
| t 7 | (0.354, 0.000) |
| t 8 | (−3.196, 0.000) |
| t 9 | (−3.196, 0.000) |

| local__fy (1-9) | local__fx (1-9) | Wy | Wx |
|---|---|---|---|
| 19.961 | 19.064 | 0.00 -> 19.28 | −25.00 -> 25.00 |

TABLE 10

(general - paraxial)

| | n | ry | rx | d | shift | tilt | nd | vd |
|---|---|---|---|---|---|---|---|---|
| | s 1 | 0.00000 | 0.00000 | 14.999 | 0.000 | 0.000 | 1.000 | |
| FFS | s 2 | −115898.270 | −115898.270 | −14.229 | −15.000 | 0.008 | 1.571 | 33.80 |
| FFS-M | s 3 | −69.74813 | −69.74813 | 14.229 | −22.284 | −51.457 | −1.571 | 33.80 |
| FFS-M | s 4 | −115898.270 | −115898.270 | 7.490 | −15.000 | 0.008 | 1.571 | 33.80 |
| FFS | s 5 | −177.76242 | −177.76242 | 2.515 | 18.986 | 53.900 | 1.000 | |
| | s 6 | 0.00000 | 0.00000 | 0.000 | 24.003 | 45.849 | 1.000 | |
| | s 7 | 0.00000 | 0.00000 | 0.000 | 24.003 | 45.849 | 1.000 | |

| | | | | | | |
|---|---|---|---|---|---|---|
| FFS | s 2 | c1 = 0.0000e+000 | c5 = 2.4399e−006 | c6 = −2.1643e−006 | c10 = −2.4842e−008 | c11 = −1.9393e−008 |
| | | c12 = 7.9239e−010 | c13 = 1.2469e−010 | c14 = −4.2009e−010 | c20 = −5.1359e−012 | c21 = 2.2647e−013 |
| | | c22 = 1.6561e−011 | c23 = −9.1951e−014 | c24 = −2.9245e−015 | c25 = 7.1386e−014 | c26 = −7.0818e−014 |
| FFS | s 3 | c1 = 3.6020e−004 | c5 = −5.0382e−006 | c6 = −2.3222e−005 | c10 = −2.6985e−007 | c11 = −7.5435e−008 |
| | | c12 = 1.3562e−009 | c13 = 1.1265e−009 | c14 = −8.2320e−010 | c20 = −5.1521e−012 | c21 = 3.8536e−012 |
| | | c22 = −7.4567e−012 | c23 = −2.8677e−013 | c24 = −6.4930e−014 | c25 = 5.9973e−014 | c26 = −2.4442e−014 |
| FFS | s 4 | c1 = 0.0000e+000 | c5 = 2.4399e−006 | c6 = −2.1643e−006 | c10 = −2.4842e−008 | c11 = −1.9393e−008 |
| | | c12 = 7.9239e−010 | c13 = 1.2469e−010 | c14 = −4.2009e−010 | c20 = −5.1359e−012 | c21 = 2.2647e−013 |
| | | c22 = 1.6561e−011 | c23 = −9.1951e−014 | c24 = −2.9245e−015 | c25 = 7.1386e−014 | c26 = −7.0818e−014 |

TABLE 10-continued

| | | | | | | | |
|---|---|---|---|---|---|---|---|
| FFS | s 5 | c1 = 1.6263e+002 | c5 = −2.2708e−004 | c6 = −1.6211e−004 | c10 = 1.2848e−005 | c11 = 1.1455e−005 | |
| | | c12 = 1.5455e−007 | c13 = −1.6524e−007 | c14 = −1.5287e−008 | c20 = 1.7362e−009 | c21 = −3.3749e−009 | |
| | | c22 = −1.4375e−008 | c23 = −1.0058e−009 | c24 = 6.4718e−011 | c25 = −8.9430e−012 | c26 = 3.8330e−011 | |

| | n | point (y, x) | ry | rx |
|---|---|---|---|---|
| | s 2 | (0.000, 0.000) | −45127.002 | −80635.471 |
| | s 3 | (0.000, 0.000) | −69.348 | −69.251 |
| | s 4 | (0.000, 0.000) | −45127.002 | −80635.471 |
| | s 5 | (0.000, 0.000) | −171.804 | −148.657 |

(local - paraxial)

| | n | local-ry | local-rx | local-fy | local-fx | local-d | nd |
|---|---|---|---|---|---|---|---|
| | s 1 | 0.00000 | 0.00000 | 0.000 | 0.000 | 14.994 | 1.000 |
| FFS | s 2 | −25504.4634 | −43006.4730 | −44674.12 | −75330.99 | 4.092 | 1.571 |
| FFS-M | s 3 | −68.87124 | −62.99956 | 21.921 | 20.052 | −7.090 | −1.571 |
| FFS-M | s 4 | −16520.5704 | −29736.7624 | −5258.313 | −9464.880 | 15.078 | 1.571 |
| FFS | s 5 | −162.88983 | −143.24854 | 285.321 | 250.917 | 5.226 | 1.000 |
| | s 6 | 0.00000 | 0.00000 | 0.000 | 0.000 | 0.000 | 1.000 |
| | s 7 | 0.00000 | 0.00000 | 0.000 | 0.000 | 0.000 | 1.000 |

| | n | hitpoint (y, x) |
|---|---|---|
| | s 1 | (0.000, 0.000) |
| | s 2 | (15.000, 0.000) |
| | s 3 | (28.212, 0.000) |
| | s 4 | (20.788, 0.000) |
| | s 5 | (−1.480, 0.000) |
| | s 6 | (−2.270, 0.000) |
| | s 7 | (−2.270, 0.000) |

| local_fy (1-7) | local_fx (1-7) | Wy | Wx |
|---|---|---|---|
| 21.412 | 19.623 | 0.00 -> 19.28 | −25.00 -> 25.00 |

TABLE 11

(general - paraxial)

| | n | ry | rx | d | shift | tilt | nd | vd |
|---|---|---|---|---|---|---|---|---|
| | t 1 | 0.00000 | 0.00000 | 14.999 | 0.000 | 0.000 | 1.000 | |
| FFS | t 2 | −115898.270 | −115898.270 | −14.229 | −15.000 | 0.008 | 1.571 | 33.80 |
| FFS | t 3 | −69.74813 | −69.74813 | 0.000 | −22.284 | −51.457 | 1.571 | 33.80 |
| FFS | t 4 | −69.74813 | −69.74813 | 1.528 | −22.284 | −51.457 | 1.571 | 33.80 |
| FFS | t 5 | −48.97320 | −48.97320 | 10.194 | −23.943 | −54.622 | 1.000 | |
| FFS | t 6 | −647.94639 | −647.94639 | 10.511 | −21.476 | −23.055 | 1.571 | 33.80 |
| FFS-M | t 7 | −69.95793 | −69.95793 | −10.511 | 8.544 | 20.000 | −1.571 | 33.80 |
| FFS-M | t 8 | −647.94639 | −647.94639 | 7.799 | −21.476 | −23.055 | 1.571 | 33.80 |
| FFS | t 9 | −75.64517 | −75.64517 | −1.291 | −16.010 | −66.323 | 1.000 | |
| | t 10 | 0.00000 | 0.00000 | 0.000 | −23.000 | −65.707 | 1.000 | |
| | t 11 | 0.00000 | 0.00000 | 0.000 | −23.000 | −65.707 | 1.000 | |

| | | | | | | |
|---|---|---|---|---|---|---|
| FFS | t 2 | c1 = 0.0000e+000 | c5 = 2.4399e−006 | c6 = −2.1643e−006 | c10 = −2.4842e−008 | c11 = −1.9393e−008 |
| | | c12 = 7.9239e−010 | c13 = 1.2469e−010 | c14 = −4.2009e−010 | c20 = −5.1359e−012 | c21 = 2.2647e−013 |
| | | c22 = 1.6561e−011 | c23 = −9.1951e−014 | c24 = −2.9245e−015 | c25 = 7.1386e−014 | c26 = −7.0818e−014 |
| FFS | t 3 | c1 = 3.6020e−004 | c5 = −5.0382e−006 | c6 = −2.3222e−005 | c10 = −2.6985e−007 | c11 = −7.5435e−008 |
| | | c12 = 1.3562e−009 | c13 = 1.1265e−009 | c14 = −8.2320e−010 | c20 = −5.1521e−012 | c21 = 3.8536e−012 |
| | | c22 = −7.4567e−012 | c23 = −2.8677e−013 | c24 = −6.4930e−014 | c25 = 5.9973e−014 | c26 = −2.4442e−014 |
| FFS | t 4 | c1 = 3.6020e−004 | c5 = −5.0382e−006 | c6 = −2.3222e−005 | c10 = −2.6985e−007 | c11 = −7.5435e−008 |
| | | c12 = 1.3562e−009 | c13 = 1.1265e−009 | c14 = −8.2320e−010 | c20 = −5.1521e−012 | c21 = 3.8536e−012 |
| | | c22 = −7.4567e−012 | c23 = −2.8677e−013 | c24 = −6.4930e−014 | c25 = 5.9973e−014 | c26 = −2.4442e−014 |
| FFS | t 5 | c1 = −1.7634e−003 | c5 = −5.7612e−006 | c6 = −1.1352e−005 | c10 = −4.9087e−008 | c11 = −2.9975e−007 |
| | | c12 = 6.4068e−009 | c13 = 3.6352e−009 | c14 = −5.1751e−009 | c20 = −1.0099e−010 | c21 = −6.5193e−011 |
| | | c22 = 1.3967e−010 | c23 = −2.7403e−012 | c24 = 7.9797e−013 | c25 = 1.0978e−011 | c26 = 8.3191e−013 |
| FFS | t 6 | c1 = 2.9876e+000 | c5 = −6.5419e−006 | c6 = −1.3179e−006 | c10 = 5.1145e−008 | c11 = −7.9584e−008 |
| | | c12 = 8.5756e−010 | c13 = −9.4449e−010 | c14 = 8.4962e−011 | c20 = 1.3419e−012 | c21 = −4.1101e−013 |
| | | c22 = −2.1030e−012 | c23 = 4.4013e−013 | c24 = −2.8629e−014 | c25 = −5.1873e−014 | c26 = −5.7318e−015 |
| FFS | t 7 | c1 = 3.9637e−003 | c5 = −4.7999e−006 | c6 = −2.5875e−006 | c10 = 8.4690e−009 | c11 = 8.5925e−008 |
| | | c12 = 7.4715e−010 | c13 = 2.1974e−010 | c14 = −3.3487e−010 | c20 = 4.9464e−012 | c21 = −2.4781e−012 |
| | | c22 = 9.3236e−012 | c23 = 1.0283e−012 | c24 = −1.6149e−013 | c25 = −5.6013e−014 | c26 = 3.9160e−014 |
| FFS | t 8 | c1 = 2.9876e+000 | c5 = −6.5419e−006 | c6 = −1.3179e−006 | c10 = 5.1145e−008 | c11 = −7.9584e−008 |
| | | c12 = 8.5756e−010 | c13 = −9.4449e−010 | c14 = 8.4962e−011 | c20 = 1.3419e−012 | c21 = −4.1101e−013 |
| | | c22 = −2.1030e−012 | c23 = 4.4013e−013 | c24 = −2.8629e−014 | c25 = −5.1873e−014 | c26 = −5.7318e−015 |

TABLE 11-continued

| FFS | t 9 | c1 = 1.5841e−001 | c5 = 1.6130e−005 | c6 = 3.0548e−005 | c10 = 8.0785e−007 | c11 = −7.1001e−007 |
|---|---|---|---|---|---|---|
| | | c12 = 8.0606e−008 | c13 = −4.7519e−008 | c14 = −6.5135e−008 | c20 = −9.1889e−010 | c21 = −1.2795e−009 |
| | | c22 = −3.5631e−010 | c23 = −4.2697e−010 | c24 = −2.1425e−011 | c25 = −2.1199e−010 | c26 = −4.7106e−011 |

| n | point (y, x) | ry | rx |
|---|---|---|---|
| t 2 | (0.000, 0.000) | −45127.002 | −80635.471 |
| t 3 | (0.000, 0.000) | −69.348 | −69.251 |
| t 4 | (0.000, 0.000) | −69.348 | −69.251 |
| t 5 | (0.000, 0.000) | −48.892 | −48.837 |
| t 6 | (0.000, 0.000) | −651.240 | −640.333 |
| t 7 | (0.000, 0.000) | −69.954 | −69.860 |
| t 8 | (0.000, 0.000) | −651.240 | −640.333 |
| t 9 | (0.000, 0.000) | −76.166 | −76.546 |

TABLE 12

(local - paraxial)

| | n | local-ry | local-rx | local-fy | local-fx | local-d | nd |
|---|---|---|---|---|---|---|---|
| | t 1 | 0.00000 | 0.00000 | 0.000 | 0.000 | 14.994 | 1.000 |
| FFS | t 2 | −25504.4634 | −43006.4730 | −44674.12 | −75330.99 | 4.092 | 1.571 |
| FFS | t 3 | −68.87124 | −62.99956 | 0.000 | 0.000 | 0.000 | 1.571 |
| FFS | t 4 | −68.87124 | −62.99956 | 0.000 | 0.000 | 1.047 | 1.571 |
| FFS | t 5 | −46.38763 | −38.82836 | 81.253 | 68.013 | 1.167 | 1.000 |
| FFS | t 6 | −678.23068 | −637.60339 | −1188.002 | −1116.839 | 4.199 | 1.571 |
| FFS-M | t 7 | −69.94885 | −69.28382 | 22.264 | 22.052 | −5.886 | −1.571 |
| FFS-M | t 8 | −673.15487 | −637.67405 | −214.258 | −202.965 | 12.270 | 1.571 |
| FFS | t 9 | −76.58853 | −75.99731 | 134.154 | 133.118 | 5.984 | 1.000 |
| | t 10 | 0.00000 | 0.00000 | 0.000 | 0.000 | 0.000 | 1.000 |
| | t 11 | 0.00000 | 0.00000 | 0.000 | 0.000 | 0.000 | 1.000 |

| n | hitpoint (y, x) |
|---|---|
| t 1 | (0.000, 0.000) |
| t 2 | (15.000, 0.000) |
| t 3 | (28.212, 0.000) |
| t 4 | (28.212, 0.000) |
| t 5 | (28.405, 0.000) |
| t 6 | (23.413, 0.000) |
| t 7 | (−8.735, 0.000) |
| t 8 | (20.485, 0.000) |
| t 9 | (4.718, 0.000) |
| t 10 | (8.003, 0.000) |
| t 11 | (8.003, 0.000) |

| local_fy (1-11) | local_fx (1-11) | Wy | Wx |
|---|---|---|---|
| 18.695 | 18.022 | −19.28 −> 0.00 | −25.00 −> 25.00 |

As described above, in each of the above embodiments, the display viewing angle is divided into two areas in the local meridional cross section, and the first and second prism systems forming two images in the two divided viewing angle areas are respectively constituted by a free-form surface prism having three surfaces. This configuration can realize an observation optical system having a reduced thickness (as described in Embodiments 1, 2, 4 and 5) or a reduced height (as described in Embodiment 3).

Moreover, providing a part shared by the first and second prism systems in the first prism can suppress generation of light scattering and flare in the joined line of the first and second images forming the combined image, which can make the joined line unnoticeable.

Although the description was made of the HMD mounted on a head of an observer in each embodiment, the present invention can be also applied to image display apparatuses other than such a HMD.

While the present invention has been described with reference to exemplary embodiments, it is to be understood that the invention is not limited to the disclosed exemplary embodiments. The scope of the following claim is to be accorded the broadest interpretation so as to encompass all modifications, equivalent structures and functions.

This application claims the benefit of Japanese Patent Application No. 2008-281775, filed on Oct. 31, 2008, which is hereby incorporated by reference herein in its entirety.

What is claimed is:

1. An image display apparatus that forms a first image and a second image of mutually different viewing angle areas of a display viewing angle to display a combined image of the first and second images joined to each other, the apparatus comprising:
   a first image-forming element configured to form a first original image;
   a second image-forming element configured to form a second original image;
   a first optical system configured to reflect a first light flux from the first image-forming element at least twice prior to introducing the first light flux to an exit pupil of the first optical system; and a second optical system configured to reflect a second light flux from the second image-forming element at least twice prior to introducing the second light flux to the first optical system, wherein, when a cross section where the first and second light fluxes are folded by reflection through the first and second optical systems is defined as a first cross section, the first optical system introduces the first light flux and the second light flux from the second optical system to the exit pupil such that first and second images, respectively corresponding to the first and second original images of the mutually different viewing angle areas, are formed in the first cross section.

2. An image display apparatus according to claim 1, wherein, the first optical system includes a first optical surface including a first effective area which reflects the first light flux and through which the second light flux from the second optical system enters the first optical system, and the second optical system includes a second optical surface including a second effective area which reflects the second light flux and through which the second light flux exits from the second optical system toward the first optical surface, the first and second optical systems being arranged such that, in the first cross section, the first effective area in the first optical surface and the second effective area in the second optical surface are displaced with respect to each other in a direction along the first and second optical surfaces.

3. An image display apparatus according to claim 2, wherein the first and second optical systems are arranged in the first cross section so as to be displaced with respect to each other in a direction in which the first effective area in the first optical surface recedes from the second image-forming element and the second effective area in the second optical surface recedes from the first image-forming element.

4. An image display apparatus according to claim 2, wherein the first and second optical systems are arranged in the first cross section so as to be displaced with respect to each other in a direction in which the first effective area in the first optical surface approaches the second image-forming element and the second effective area in the second optical surface approaches the first image-forming element.

5. An image display apparatus according to claim 1, wherein each of the first and second optical systems is formed by a prism element containing with a medium having a refractive index greater than 1.

6. An image display apparatus according to claim 5, wherein an air layer is disposed between the first and second optical surfaces.

7. An image display apparatus according to claim 1, wherein each of the first and second optical systems has three optical surfaces including two reflective surfaces.

8. An image display apparatus according to claim 1, wherein, when a cross section orthogonal to the first cross section is defined as a second cross section, and a focal length in the second cross section of an entire optical system constituted by the first and second optical systems is shorter than a focal length in the first cross section of the entire optical system.

* * * * *